United States Patent
Gergic et al.

(10) Patent No.: US 7,487,440 B2
(45) Date of Patent: Feb. 3, 2009

(54) REUSABLE VOICEXML DIALOG COMPONENTS, SUBDIALOGS AND BEANS

(75) Inventors: Jaroslav Gergic, Kocbere (CZ); Rafah A. Hosn, Stamford, CT (US); Jan Kleindienst, Kladno (CZ); Stephane H. Maes, Danbury, CT (US); Thiruvilwamalai V. Raman, San Jose, CA (US); Jan Sedivy, Prague (CZ); Ladislav Seredi, Prauge (CZ)

(73) Assignee: International Business Machines Corporation, Armonk, NY (US)

( * ) Notice: Subject to any disclaimer, the term of this patent is extended or adjusted under 35 U.S.C. 154(b) by 1283 days.

(21) Appl. No.: 10/007,084

(22) Filed: Dec. 4, 2001

(65) Prior Publication Data

US 2002/0198719 A1 Dec. 26, 2002

Related U.S. Application Data

(60) Provisional application No. 60/251,085, filed on Dec. 4, 2000.

(51) Int. Cl.
*G06F 15/00* (2006.01)
*G06F 17/00* (2006.01)

(52) U.S. Cl. .................. 715/234; 704/10; 704/235; 704/246; 704/260

(58) Field of Classification Search ............ 704/275, 704/270.1, 270, 10, 235, 246, 260; 709/219; 715/234
See application file for complete search history.

(56) References Cited

U.S. PATENT DOCUMENTS 6,240,391 B1 * 5/2001 Ball et al. ............ 704/270
6,269,336 B1 * 7/2001 Ladd et al. ........... 704/270
6,336,137 B1 * 1/2002 Lee et al. ............. 709/219
6,424,945 B1 * 7/2002 Sorsa ................ 704/270.1
6,490,564 B1 * 12/2002 Dodrill et al. .......... 704/275
6,578,000 B1 * 6/2003 Dodrill et al. .......... 704/270
6,604,075 B1 * 8/2003 Brown et al. .......... 704/270.1
6,636,831 B1 * 10/2003 Profit et al. ........... 704/275

OTHER PUBLICATIONS

Voice XML Forum, "Voice eXtensible Markup Languag (VoiceXML) versin 1.0", May 5, 2000. available at <"http://www.w3.org/TR/2000/Note-voicexml-20000505">.*

(Continued)

*Primary Examiner*—William L Bashore
(74) *Attorney, Agent, or Firm*—F. Chau & Associates, LLC

(57) ABSTRACT

Systems and methods for building speech-based applications using reusable dialog components based on VoiceXML (Voice eXtensible Markup Language). VoiceXML reusable dialog components can be used for building a voice interface for use with multi-modal, multi-channel and conversational applications that offer universal access to information anytime, from any location, using any pervasive computing device regardless of its I/O modality. In one embodiment, a framework for reusable dialog components built within the VoiceXML specifications is based on the <subdialog> tag and ECMAScript parameter objects to pass parameters, configuration and results. This solution is interpreted at the client side (VoiceXML browser). In another embodiment, a framework for reusable dialog components is based on JSP (Java Server Pages) and beans that generate VoiceXML subdialogs. This solution can be evaluated at the server side. These frameworks can be mixed and matched depending on the application.

30 Claims, 4 Drawing Sheets

OTHER PUBLICATIONS

U.S. Appl. No. 09/544,823, filed Apr. 6, 2000, entitled *Methods and Systems for Multi-Modal Browsing and Implementation of a Conversational Markup Language*.

U.S. Appl. No. 09/837,024, filed Apr. 18, 2001, entitled *Systems and Methods for Providing Conversational Computing Via Javaserver Pages and Javabeans*.

* cited by examiner

REUSABLE VOICEXML DIALOG COMPONENTS, SUBDIALOGS AND BEANS

CROSS-REFERENCE TO RELATED APPLICATION

This application is based on, and claims priority to, U.S. Provisional Application No. 60/251,085, filed on Dec. 4, 2000, which is fully incorporated herein by reference.

COPYRIGHT NOTICE

A portion of the disclosure of this patent document contains material which is subject to copyright protection. The copyright owner has no objection to the facsimile reproduction by any one of the patent document or the patent disclosure, as it appears in the patent and Trademark Office patent file or records, but otherwise reserves all copyright rights whatsoever.

TECHNICAL FIELD OF THE INVENTION

The present invention relates generally to systems and methods for building speech-based applications and architectures and, in particular, to server-side and client-side speech frameworks employing reusable dialog components based on VoiceXML (Voice extensible Markup Language).

BACKGROUND OF THE INVENTION

The computing world is evolving towards an era where billions of interconnected pervasive clients will communicate with powerful information servers. Indeed, this millennium will be characterized by the availability of multiple information devices that make ubiquitous information access an accepted fact of life. This evolution towards billions of pervasive devices being interconnected via the Internet, wireless networks or spontaneous networks (such as Bluetooth and Jini) will revolutionize the principles underlying man-machine interaction. In the near future, personal information devices will offer ubiquitous access, bringing with them the ability to create, manipulate and exchange any information anywhere and anytime using interaction modalities most suited to the an individual's current needs and abilities. Such devices will include familiar access devices such as conventional telephones, cell phones, smart phones, pocket organizers, PDAs and PCs, which vary widely in the interface peripherals they use to communicate with the user.

The increasing availability of information, along with the rise in the computational power available to each user to manipulate this information, brings with it a concomitant need to increase the bandwidth of man-machine communication. The ability to access information via a multiplicity of appliances, each designed to suit the individual's specific needs and abilities at any given time, necessarily means that these interactions should exploit all available input and output (I/O) modalities to maximize the bandwidth of man-machine communication. Indeed, users will come to demand such multi-modal interaction in order to maximize their interaction with information devices in hands-free, eyes-free environments.

VoiceXML is a markup language designed to facilitate the creation of speech applications such as IVR (Interactive Voice Response) applications. Compared to conventional IVR programming frameworks that employ proprietary scripts and programming languages over proprietary/closed platforms, the VoiceXML standard provides a declarative programming framework based on XML (eXtensible Markup Language) and ECMAScript (see, e.g., the W3C XML specifications (www.w3.org/XML) and VoiceXML forum (www.voicexml.org)). VoiceXML is designed to run on web-like infrastructures of web servers and web application servers (i.e. the Voice browser). VoiceXML is a key component for providing a voice interface to Mobile e-business. Indeed, VoiceXML allows information to be accessed by voice through a regular phone or a mobile phone whenever it is difficult or not optimal to interact through a wireless GUI micro-browser.

More importantly, VoiceXML is a key component to building multi-modal systems such as multi-modal and conversational user interfaces or mobile multi-modal browsers. Multi-modal e-business solutions exploit the fact that different interaction modes are more efficient for different user interactions. For example, depending on the interaction, talking may be easier than typing, whereas reading may be faster than listening. Multi-modal interfaces combine the use of multiple interaction modes, such as voice, keypad and display to improve the user interface to e-business. Advantageously, multi-modal browsers can rely on VoiceXML browsers and authoring to describe and render the voice interface.

There are still key inhibitors to the deployment of compelling multi-modal e-business applications. Most arise out of the current infrastructure and device platforms. Indeed, the current networking infrastructure is not configured for providing seamless, multi-modal access to information. Indeed, although a plethora of information can be accessed from servers over a communications network using an access device (e.g., personal information and corporate information available on private networks and public information accessible via a global computer network such as the Internet), the availability of such information may be limited by the modality of the client/access device or the platform-specific software applications with which the user is interacting to obtain such information. For instance, current wireless network infrastructure and handsets do not provide simultaneous voice and data access. Middleware, interfaces and protocols are needed to synchronize and manage the different channels.

Currently, application authoring methodologies are being developed to provide means to develop rich multi-modal applications. It is anticipated that most multi-modal mobile deployment will rely on wireless PDAs that can overcome the above challenges by hosting a VoiceXML browser on the client (fat client configuration) or by relying on sequential or notification-based multi-modal scenarios, where the user switches connectivity when he or she wants to interact through another modality.

Because of the inherent challenges of conversational engines (e.g., speech recognizer) that require data files (e.g., grammars), however, it is important to provide mechanisms that provide tools that hide this level of complexity. It is also important that such mechanisms and tools overcome some of the limitations imposed by VoiceXML (e.g. the VoiceXML execution model). Thus, while it is anticipated that voice (alone for multi-channel applications) and multi-modal will be key catalyst to wide adoption of mobile e-business, it is believed that such wide spread adoption of such voice and multi-modal interfaces will remain challenging until tools for building applications using voice-based reusable dialog components are available to non-speech specialists.

The VoiceXML Forum has submitted VoiceXML 1.0 to the W3C Voice Browser activity (see, e.g., W3C voice browser activity, www.w3.org/voice/). As part of its activities, the W3C Voice Browser working group has identified reusable dialog components as an item worth studying and it published a set of associated requirements (see, e.g., the W3C reusable dialog requirements for voice markup language (www.w3.org/TR/reusable-dialog-reqs)).

Accordingly, VoiceXML frameworks for reusable dialog components (server-centric and client-centric), which satisfy the published W3C reusable dialog component requirements while remaining compliant with the VoiceXML specifications, for example, would be a significant component for building voice interfaces and multi-modal applications that seamlessly operate across a plurality of channels.

SUMMARY OF THE INVENTION

The present invention relates generally to systems and methods for building speech-based applications and, in particular, to server-side and client-side speech frameworks employing reusable dialog components based on VoiceXML (Voice eXtensible Markup Language). VoiceXML reusable dialog components according to the present invention can be used for building a voice interface for use with multi-modal, multi-channel and conversational applications that offer universal access to information anytime, from any location, using any pervasive computing device regardless of its I/O modality.

In one aspect of the present invention, a method for authoring a speech application comprises the steps of:
creating one or more reusable VoiceXML dialog components;
creating an associated parameter object for each of the reusable VoiceXML dialog components; and
creating a VoiceXML document comprising code for invoking a reusable VoiceXML dialog component and code for configuring the invoked reusable VoiceXML dialog component using an associated parameter object.

In another aspect, a speech application server comprises:
a VoiceXML processor for parsing and rendering a VoiceXML document; and
a library comprising one or more reusable VoiceXML dialog components that are accessible by the VoiceXML processor, wherein the VoiceXML document comprises code for invoking a reusable VoiceXML dialog component and code for configuring the invoked reusable VoiceXML dialog component using an associated parameter object.

In a preferred embodiment, a client-side reusable dialog component framework is built within the VoiceXML specifications and utilizes <subdialog> elements to call reusable VoiceXML dialog components and associated ECMAScript parameter objects to pass parameters, configuration and results. This solution is interpreted at the client side (VoiceXML browser).

In another aspect of the present invention, a server-side speech application server comprises:
a VoiceXML page generation engine for dynamically building a VoiceXML page;
a first database comprising one or more server-side reusable VoiceXML dialog components that are accessible the VoiceXML page generation engine for generating an intermediate VoiceXML page;
a second database comprising backend data that is accessible by the VoiceXML page generator to insert data in the intermediate VoiceXML page to generate a VoiceXML page that is served to a requesting client.

Preferably, a server-side framework for reusable dialog components is based on JSP (Java Server Pages) and beans that generate VoiceXML subdialogs.

In another aspect of the present invention, the server-side and client-side frameworks for reusable VoiceXML dialog components can be combined to provide a desired solution.

In another aspect of the present invention, reusable VoiceXML dialog components are "re-entrant" to allow the reusable VoiceXML dialog components to be initiated, interrupted, inspected, and/or resumed with a partially filled result object or state object.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

Figure 1:
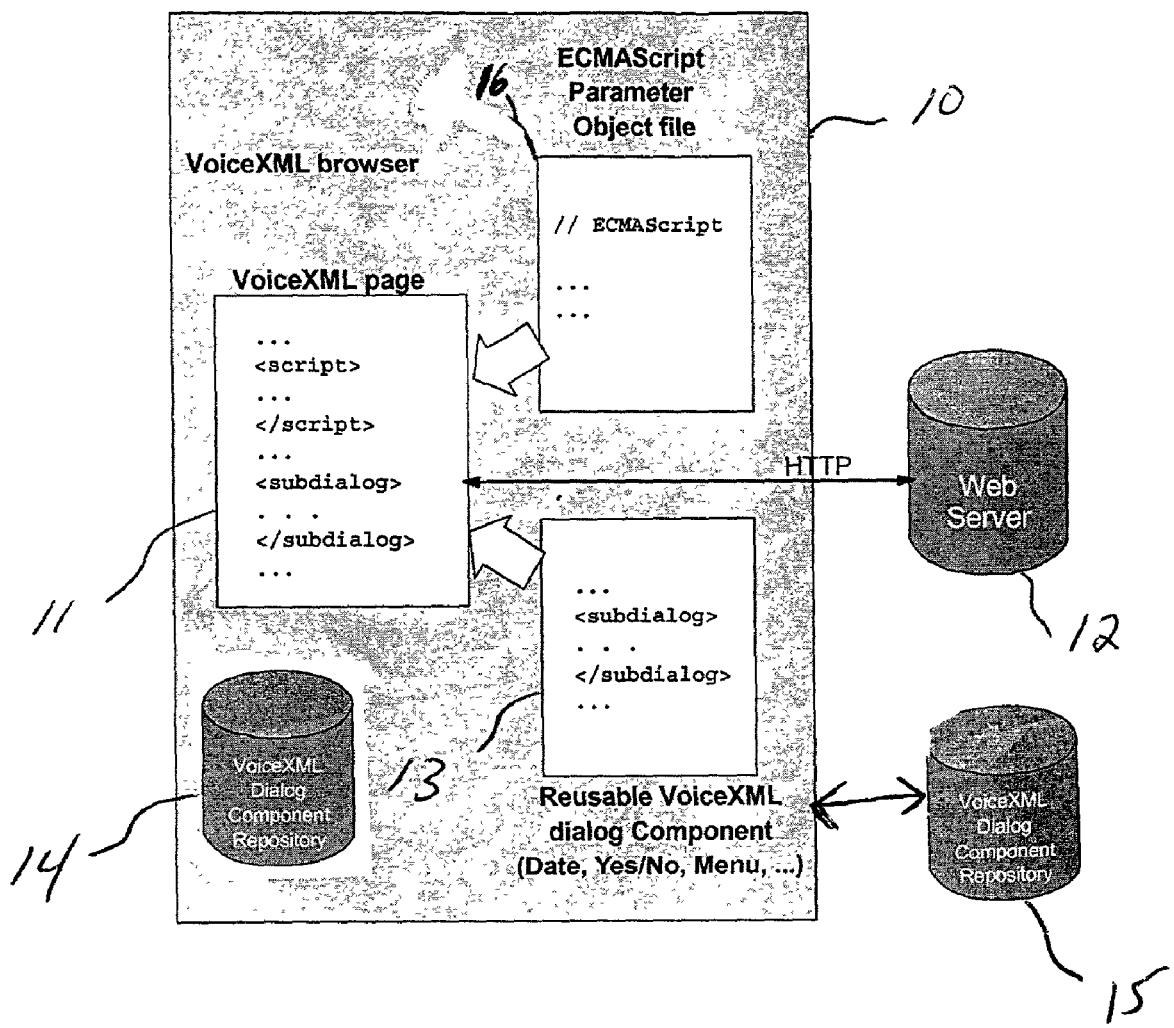
FIG. 1 is a diagram of a system and method for implementing reusable VoiceXML dialog components according to an embodiment of the present invention.

The present invention relates generally to systems and methods for building speech-based applications and, in particular, to server-side and client-side speech frameworks employing reusable dialog components based on VoiceXML (Voice eXtensible Markup Language). VoiceXML reusable dialog components according to the present invention can be used for building speech interfaces for multi-modal, multi-channel and conversational applications that offer universal access to information anytime, from any location, using any pervasive computing device regardless of its I/O modality.

It is to be understood that the term "channel" used herein refers to a particular renderer, device, or a particular modality. Examples of different modalities/channels include speech such as VoiceXML, visual (GUI) such as HTML (hypertext markup language), restrained GUI such as WML (wireless markup language), CHTML (compact HTML), XHTML-MP (XHTML Mobile profile), and HDML (handheld device markup language) or any combination of such modalities.

The term "multi-channel application" refers to an application that provides ubiquitous access through different channels (e.g., VoiceXML, HTML), one channel at a time. Multi-channel applications do not provide synchronization or coordination across the views of the different channels.

The term "multi-modal" application refers to multi-channel applications, wherein multiple channels are simultaneously available and synchronized. Furthermore, from a multi-channel point of view, multi-modality can be considered another channel.

Furthermore, the term "conversational" or "conversational computing" as used herein refers to seamless multi-modal dialog (information exchanges) between user and machine and between devices or platforms of varying modalities (I/O capabilities), regardless of the I/O capabilities of the access device/channel, preferably, using open, interoperable communication protocols and standards, as well as a conversational (or interaction-based) programming model that separates the application data content (tier 3) and business logic (tier 2) from the user interaction and data model that the user manipulates. The term "conversational application" refers to an application that supports multi-modal, free flow interactions (e.g., mixed initiative dialogs) within the application and across independently developed applications, preferably using short term and long term context (including previous input and output) to disambiguate and understand the user's intention. Conversational application preferably utilize NLU (natural language understanding).

The following detailed description of preferred embodiments is divided into the following sections for ease of reference: Section I below provides a general description of VoiceXML reusable components according to the present invention, as well as the need, motivation and advantages of implementing frameworks based on VoiceXML reusable dialog components; Section II describes preferred embodiments of VoiceXML dialog component frameworks according to the present invention; Section III describes preferred dialog object interfaces and behaviors to support mixed initiative across subdialogs, documents and modalities using VoiceXML reusable components; and Section IV enumerates preferred specification standards for VoiceXML dialog components that fall within the W3C speech framework, as well as extensions for future platforms and standards.

I. Motivation For Employing VoiceXML Reusable Dialog Components

As noted above, specifications for reusable components are being developed within the W3C speech framework. According to the W3C reusable dialog requirements, reusable dialog components provide prepackaged functionality "out-of-the-box" that enables developers to build applications by providing standard default settings and behavior. The reusable dialog components shield developers from having to worry about many of the intricacies associated with building a robust speech dialogue, e.g., confidence score interpretation, error recovery mechanisms, prompting, etc. This behavior can be customized by a developer, if desired, to provide application-specific prompts, vocabulary, retry settings, etc.

Reusable dialog components are classified herein as "task" types and "template" types. Task components are designed to obtain some piece or pieces of information (e.g., get a date). Although task components can be configured, they will operate as-is. Template components require configuration and need to be parameterized (e.g., select a menu item, wherein the menu list must be provided.

The VoiceXML specifications identify the possibility of using declarative reusable VoiceXML pages to create a reusable library of dialogs shared among many applications. It has also been recognized that prepackaged dialogs designed to reduce the application developers effort through appropriate abstraction can occur at many levels and can be implemented in a number of different ways. For example, parameterized dialogs can be implemented as markup elements with attributes and sub-elements, as scripts built of markup elements and variables (perhaps stored in a standard library of such dialogs), or as native, pre-compiled, or otherwise non-markup language objects or modules. Therefore, from an application developer's point of view, it is advantageous to provide prepackaged reusable dialog components and sample code that can be use as libraries or as sample code/templates to build more complex applications and reusable dialog modules or customize them.

Further, it would be highly advantageous to provide dialog reusable components authored in VoiceXML. Indeed, currently, there are a variety of VoiceXML applications that are being used or developed in which VoiceXML reusable components would provide a mechanism for seamless and synchronized multi-modal interactions across a plurality of channels. Such speech applications include, for example, IVR-centric, server-centric, client-centric and embedded implementations. Further, reusable VoiceXML components (which are based on extensions of the VoiceXML standard) would enable development of mixed initiative speech applications, as well as integrated speech applications (VoiceXML) within existing web infrastructures (multi-channel, multi-modal and conversational applications).

The following sections describe frameworks according to the present invention for implementing reusable dialog components, subdialogs, and beans, which are built within VoiceXML specifications.

II. Frameworks For Reusable VoiceXML Dialog Components

In one embodiment of the present invention, reusable VoiceXML dialog components are built using VoiceXML <subdialog> elements and using associated ECMAScript parameter objects to pass parameters, configuration and results. This framework comprises a client-centric approach (e.g., VoiceXML browser) using-side reusable dialog components. The present inventions provides various frameworks for reusable dialog components built within the VoiceXML specifications.

In another embodiment, server-centric framework for implementing reusable VoiceXML components, wherein VoiceXML pages are dynamically generated to provide, e.g., dynamic manipulation or prompts, dynamic grammar compilation and dynamic access to data sources. In one preferred embodiment, a server-centric framework is based on JSP (Java Server Pages) and beans that generate VoiceXML subdialogs. In other embodiments of the present invention, a reusable VoiceXML component framework can be built using a combination of client-side and server-side reusable dialog components.

It is to be understood that the term "client-side" or "client-centric" processing as used herein refers to processing that occurs directly at the level of the presentation layer which, in the present invention, comprise a VoiceXML browser. This does not mean that the VoiceXML browser is actually physically located on the client. The VoiceXML browser may be located on the server-side, behind the telephony card, IVR or Gateway (PSTN or VoIP). Furthermore, with fat client configurations of multi-modal browsers, embedded native VoiceXML browser can appear on the client. Such configuration may introduce significant new challenges including, for example, delays, network latencies, bandwidth limitations and network overload when loading data files associated to a new VoiceXML page; and limitation of the capabilities of the local engine (500 words vocabulary), etc. These considerations are important and should not be underestimated when designing a particular solution. However, such issues are beyond the scope of this application.

It is to be further understood that the term "server-side" or "server-centric" processing refers to processing that is executed at the level of a network application server (e.g., web application server) and not at the level of an earlier piece of middleware. As a simple analogy in the web/HTML world, we would consider Javascript, Applets and static long HTML pages (or even DHTML pages) as client-side processing and CGI, JSP/Beans, ASPs and servlets as server-side processing.

Therefore, in the present case, client-side processing implies that the reusable dialog components are loaded "as is" by a Voice browser/platform to provide the voice interaction to the user. Server-side processing implies that the reusable dialog component run at the level of the web application server to contribute to the generation of the next VoiceXML page shipped and loaded by the VoiceXML browser.

Advantageously, as explained below, reusable VoiceXML component frameworks according to the present invention remain within the VoiceXML specifications and require no modification of the VoiceXML interpreter (except for features such as dynamic compilation of grammars wherein the present invention offers mechanisms for extending VoiceXML to provide such functionality).

A Reusable VoiceXML Dialog Components

FIG. 1 is a diagram of a system and method for implementing reusable VoiceXML dialog components according to an embodiment of the present invention. In this embodiment, reusable dialog components are built using VoiceXML subdialogs and passing arguments through ECMAScript objects. ECMAScript is an object-oriented programming language for performing computations and manipulating computational objects within a host environment The framework of FIG. 1 is compatible with any existing VoiceXML interpreter, independently of specific implementation platforms.

A <subdialog> element invokes a "called" dialog (referred to as a subdialog) identified by its src attribute in the "calling" dialog (the src comprises the URI of the <subdialog>). A <subdialog> field item is similar to a function call: it invokes another dialog on a current page, or invokes another VoiceXML document and returns an ECMAScript Object as its result. In accordance with the present invention, subdialogs allow the reuse of a common dialog and are used to build libraries of reusable applications.

Referring now to FIG. 1, a VoiceXML browser 10 receives a VoiceXML page 11 from a Web server 12 using, e.g., HTTP. The VoiceXML page comprises one or more <subdialog> and <script>elements. A plurality of reusable VoiceXML dialog components 13 may be maintained client-side in local libraries 14. Further, reusable VoiceXML dialog components 13 may be maintained and retrieved from a remote repository 15. The repository 15 can be a public resource or a server-side (web server) repository adapted to the current VoiceXML application by the developer.

In the framework of FIG. 1, an ECMAScript parameter object 16 is created for each reusable VoiceXML dialog component. The parameter objects 16 are populated with the appropriate parameter values. For task reusable VoiceXML dialog components, all the parameters are optional. For template reusable VoiceXML dialog components, additional configuration parameters are needed (e.g. the collection of menu items which will be rendered by a navigation menu reusable VoiceXML dialog component). The ECMAScript parameter object 16 is characterized by the use of ECMAScript parameter objects as containers that provide: default prompts and other object-specific resources, constructor that combines default and application-specific parameters, common methods for manipulating parameter content.

The Reusable VoiceXML dialog components 13 are invoked via the <subdialog> tag in a VoiceXML page 11. The parameter objects 16 are called from an ECMAScript <script> in the VoiceXML page 11. The VoiceXML browser 10 comprises a ECMAScript host environment. Each reusable VoiceXML dialog component 13 receives its respective ECMAScript parameter object 14 which is created as described above. Passing only one parameter in the <subdialog> simplifies the readability of the code since the amount and complexity of parameters even for a single reusable VoiceXML dialog component can be enormous. The execution follows the VoiceXML specifications.

The reusable VoiceXML dialog components 13 are implemented as standard VoiceXML documents referenced by the src attribute of the VoiceXML <subdialog>. The results of the reusable VoiceXML dialog components 13 are returned in the return variable of the associated ECMAScript parameter objects 16. Advantageously, this framework readily fits the Natural Language Semantics Markup Language for the W3C speech interface (see, e.g., www.w3.org/TR/nl-specs/).

As noted above, a library of VoiceXML reusable dialog component may reside on the server repository 15 for dynamic HTTP access at execution, or may reside locally to the VoiceXML browser 10. The local library may be downloaded and updated from the same server repository 15. The associated parameter object files are available (same name, .js extension instead of .vxml).

Task-type reusable VoiceXML dialog components can be directly used without customization/configuration. However, the components can also be downloaded in advance by the application developer for customization of the associated parameter object files and adaptation of the components. When customized, it is important to update the src arguments, especially for the parameter object files.

Template-type of reusable VoiceXML components require configuration of the associated parameter object files. Therefore, they should be downloaded, adapted and the src arguments should be updated.

It is to be appreciated that the respositories 15, 15 may further comprise emcompass default grammars and audio prompts to support the basic behavior of the reusable VoiceXML dialog components 13. Futher, the system can provide libraries or repositories of reusable ECMAScript functions that may be used in the .js files. Until supported by VoiceXML, the repository 15 or other servers can provide dynamic browser client platform.

It is to be futher appreciated that the amount of customization/adaptation that is needed can be limited by providing rich libraries expanding on the reusable components identified in the W3C reusable dialog component requirements. In addition, standardized sets of such subdialogs ("reuasable VoiceXML dialog modules") can be installed on the Voice browser side as libraries that are available to the user.

The following skeleton example illustrates the use and call of reusable VoiceXML dialog components. To begin, the following code (myComponentExample.vxml) illustrates a VoiceXML skeleton page with internal calls to a reusable VoiceXML dialog component:

```
<?xml version="1.0">
<xml version="2.0"> <!--File myComponentExample.vxml
-->
    <!-- simpComponent: object for passing parameters to sub-
        dialog -->
    <script src="simpComponent.js"/> <!-- include object
        class definition -->
    <!-- instance of simpleComponent -->
    <script>
        var mySimpComponent=new simpComponent(<!--EC-
            MAScript
        specification of return parameters -->
            <!--ECMAScript instantiation and passage of con-
            figuration
            parameters -->
```

```
        );
    </script>
    <!---->
    <doem id="myComponentExample">
        <block>
            <prompt>This is a demo of calling simple reusable
                VoiceXML
            dialog component </prompt>
        </block>
        <!-- simple Component Example -->
        <subdialog       name="simpComponentExample"
            src=simpComponent.vxml">
            <param name="MP" expr="mySimpComponent"/>
            <filled>
                <var name="myResult"
                expr="simpComponentExample.result"/>
                <prompt>You have selected: <value
                expr="myResult"/></prompt>
            </filled>
        </subdialog>
    </form>
</vxml>
```

It is to be appreciated that this formulation supports any type of reusable dialog components such as task or template components.

The following code (simpComponent.vxml) illustrates a corresponding VoiceXML skeleton page comprising the reusable VoiceXML dialog component:

```
<?xml version="1.0"?>
<vxml version="2.0"> <!-- File simpComponent.vxml -->
    <form id="Component">
        <!-- parameter object -->
        <var name="MP"/>
        <!-- local vars -->
        <var name="local1" expr="MP.item1"/>
        <!--any other local value assignment -->
        -->
        <!-- Reusable component dialog logic code-->
        <!-- This includes possible use of dynamic audio sources
            as
        allowed by VoiceXML 2.0.-->
        <!-- It may also require support of dynamic grammar
            generation
        not yet supported in VoiceXML 2.0 (see below for alter-
            native)-->
        <grammar src="javascript:MP.grammar"/>
    </form>
</vxml>
```

For template as well as some task ojects, mechanisms are preferably employed to support dynamic grammar compilation. One example is illustrated below with an example reusable VoiceXMXL dialog component referred to as simpNavMenu.vxml.

The following code(simpComponent.js)illustrates a corresponding mechanism to pass parameters, configuration to and from the reusable VoiceXML dialog component:

```
// File simpComponent.js
// ECMAscript functions to create prompts and other object-
    specific
// resources (grammars etc . . . ). (Optional)
// For example:
function makeFullPrompt=p_prompt, p_list1, p_list2) {
    var fullPrompt=p_prompt;
    for (var index in p_list1) {
        fullPrompt=fullPrompt+p_list1[index]+'. ';
    }
    fullPrompt=fullPrompt +'or ';
    for (var index in p_list2) {
        fullPrompt=fullPrompt+p_list2[index]+'. ';
    }
    return fullPrompt
}
function makeFullGram(base, p_list1, p_list2, trailer) {
    var fullGram='';
    for (var index in p_list1) {
        fullGram =fullGram+p_list1[index]+'|';
    }
    for (var index in p_list2) {
        fullGram=fullGram+p_list2[index]+'|';
    }
    // remove trailing separator
    if (fullGram !='')
        fullGram       =base+fullGram.substring(0,fullGram-
            .length-3)+trailer;
    return fullGram
// Mandatory object container that combines default and
    application-
// specific parameters, create default prompts, grammars and
    other
// other specific and resources and provides common methods
    for
function simpComponent(
    p_compTxT
) {
    // methods
    this.mFPrompt=makeFullPrompt;
    this.mFGram=makeFullGram;
    // constants
    this.const1=0;
    // mandatory properties
    this.compTxt=p_compTxt;
    // optional properties and resources (grammars)
    this.compGram=new Array( 'textone', 'Texttwo', 'Text-
        three');
    // internal variables
    this.promptCurr_txt='Default text is:';
    this.helpText=this.mFPrompt('You       can      say:     ',
        p_compTxt,
    this.compGram);
    this.nomatchTxt='I  didn\'t  understand  you.  '+this.
        compTxt;
    this.noimpTxt='I didn\'t hear you. '+this.compTxt;
    // dynamic grammar source (needed only for template-type
        of reusable
    VoiceXML dialog components.
    this.grammar=this.mFGram('grammar          GR;\npublic
        <top>=', p_compTxt,
    this.compGram, ';\n');
    // optional properties
    this.prompt1init_txt='Please so something useful.';
    this.prompt1curr_txt=this.promptCurr_txt;
    this.prompt1cansay_txt='';
    this.prompt1init_aud='prompt1init.wav';
    this.prompt1cansay_aud='prompt1cansay.wav';
    this.prompt2init_txt='';
    this.prompt2curr_txt=this.promptCurr_txt;
    this.prompt2cansay_txt='';
    this.prompt2init_aud='prompt2init.wav';
    this.prompt2cansay_aud='prompt2cansay.wav';
    this.help1txt=this.helpTxt;
    this.help2txt=this.helpTxt;
    this.help1aud='help1aud.wav';
    this.help2aud='help2aud.wav';
    this.nomatch1txt=this.nomatchTxt;
```

```
     this.nomatch2txt=this.nomatchTxt;
     this.nomatch1aud='nomatch1aud.wav';
     this.nomatch2aud='nomatch2aud.wav';
     this.noimp1aud='noimp1aud.wav';
     this.noimp2aud='noimp2aud.wav';
     this.filledTxt='';
     this.filledAud='filledAud.wav';
     this.errorTxt='Sorry, must exit due to an execution error.
       Call back later, please.';
     this.errorAud='errorAud.wav';
}
```

The above myComponentExample.vxml1 illustrates the creation of an ECMAScript parameter object (mySimpComponent) for each reusable VoiceXML dialog component. The parameter objects are populated with the appropriate parameters. Again, as noted above, all parameters are optional for task reusable VoiceXML dialog components and for templaet reusable VoiceXML dialog components, additional configuration parameters are mandatory (e.g. the collection of menu items which will be rendered by a navigation menu reusable VoiceXML dialog component).

The above simpComponent.js illustrates the use of EMCAScript parameter objects as containers that provide: (i) default prompts and other object-specific resources; (ii) constructor that combines default and application-specific parameters; and (iii) common methods for manipulating parameter content.

The reusable VoiceXML dialog components are invoked via the <subdialog>tag. Each reusable VoiceXML dialog component is passed its respective ECMAScript parameter object created as described above. It is to be understood that the above example illustrates passing only one parameter in the <subdialog>for purpose of simplyfing the readability of the code but that the amount and complexity of parameters even for a reusable VoiceXML dialog component will vary. Advantageously, the execution flow follows the VoiceXML specifications.

As shown in the exemplary program code above, the reusable voiceXML dialog components are implemented as standard VoiceXML documents referenced by the src attribute of the VoiceXML <subdialog>. The simpComponent.vxml illustrates a skeleton reusable VoiceXML dialog component (simpComponent). The results of the reusable VoiceXML dialog component is returned in the return variable of the associated ECMAScript parameter object.

The following are detailed examples of the implementation of a task type (simpDate.vxml) and a template type (simpNavMenu.vxml)reusable VoiceXML dialog components.

The following VoiceXML file (MyTest.vxml) illustrates a file that calls two reusable VoiceXML dialog components:

```
<?xml version="1.0"?>
<vxml version="2.0">
  <!-- simple date: object for passing parameters to subdialog -->
  <script src="simpDate.js"/><!-- include object class definition -->
  <!-- instance of simple date -->
  <script>
    var mySimpdate=new simpDate( );
  </script>
  script src="simpNavMenu.js"/> <!-- include oject class definition -->
  <!-- instance of navigable menu -->
  <script>
    var myNavMenu=new simpNavMenu(
      new Array( 'opera'
        'concert'
        'exhibition'
        'theatre'
        'musical')
    );
  </script>
  <!-- -->
  <form id="myTest">
    <block>
      <prompt>Hi! This is a demo of a simple date object.
      </prompt>
    </block>
    <!-- simple date -->
    <subdialog           name="simpDateExample"
      src="simpDate.vxml">
      <param name="MP" expr="mySimpDate"/>
      <filled>
        <var                       name="myResult"
          expr="simpDateExample.result"/>
        <prompt>You     have     selectedL     <value
          expr="myResult"/></prompt>
      </filled>
    </subdialog>
    <!-- -->
    <block>
      <prompt>Hi! This is a demo of a navigable menu
        object.</prompt>
    </block>
    <!-- navigable menu -->
    <subdialog           name="navMenuExample"
      src="simpNavMenu.vxml">
      param name="MP" expr="myNavMenu"/>
      <filled>
      <var name="myResult" expr"navMenuExample.result"/>
      <prompt>You     have     selected:     <value
        expr="myResult"/></prompt>
      <filled>
    </subdialog>
    !---->
  </form>
</vxml>
```

The following code illustrates a task-type reusable Voice XML dialog component (simpDate.vxml): to collect a date input:

```
<?xml version="1.0 "?>
<vxml version="2.0 ">
  <form id ="simpDateImput">
    <!-- parameter object -->
    <var name="MP"/>
    <!-- local vars -->
    var name="result" expr=""""/>
    field name="dateInputField">
      <prompt count="">
        <!-- VXML 2.0 solution: dynamic audio source -->
        <audio src="MP.prompt1 _aud"><value
          expr="MP.prompt1_txt"/></audio>
      </prompt>
      </prompt count="2">
        <audio src="MP.prompt2_aud"><value
          expr="MP.prompt2_txt"/></audio>
      </prompt>
      <grammar src="simpDate.gram"/>
      <help                       count="1"><audio
        src="MP.help1aud"><value
          expr="MP.help1txt"/></audio></help>
      <help                       count="2"><audio
        src="MP.help2aud"><value
```

```
expr="MP.help2txt"/></audio></help>
        <nomatch                count="1"><audio
    src="MP.nomatch1aud"><value
expr="MP.nomatch1txt"/></audio></nomatch>
        <nomatch                count="2"><audio
    src="MP.nomatch2aud"><value
expr="MP.nomatch2txt"/></audio></nomatch>
        <noinput                count="1"><audio
    src="MP.noimp1aud"><value
expr="MP.noimp1txt"/></audio></noinput>
        <noinput                count="2"><audio
    src="MP.noimp2aud"><value
expr="MP.noimp2txt"/></audio></noinput>
        <error><audio src="MP.errorAud"><value
expr="MP.errorTxt"/></audio><exit/></error>
        <filled>
          <prompt><audio src="MP.filledAud"><value
expr="MP.filledTxt"/></audio></prompt>
          <assign name="result" expr="dateInputField"/>
          <return namelist="result"/>
         </filled>
      </field>
    </form>
</vxml>
```

The following program code illustrates a template-type reusable VoiceXML dialog component (simpNavMenu.vxml) to present a select menu. As noted above, template type reusable VoiceXML dialog component require support for dynamic grammar compilation to build on the fly grammar of the items to select in a dynamic menu.

```
<?xml version="1.0"?>
<vxml version="2.0 ">
    <form id="navMenu">
        <!-- parameter object -->
        <var name="MP"/>
        <!-- local vars -->
        <var  name="maxSelIndex"  expr="MP.selTxt.length-
            1"/>
        <var name="curSelIndex" expr="0"/>
        <var name="result" expr=" "/>
        <var name="curItemTxt" expr=" "/>
        <!-- generate actual prompt -->
        <block name="setActPrompt">
          <if cond="MP.prompt1curr_txt!=' '">
            <assign              name="curItemTxt"
              expr="MP.prompt1curr_txt+' '+MP.selTxt
              [curSelIndex]"/>
          </if>
        </block>
        <field name="navSelect">
          <prompt count="1">
          <!-- VXML 2.0 solution: dynamic audo source -->
          <audio expr="MP.prompt1init_aud"><value
expr="MP.prompt1init_txt"/></audio>
          <value expr="curItemTxt"/>
          <audio expr="MP.prompt1cansay_aud"><value
expr="MP.prompt1cansay_txt"/></audio>
          </prompt>
          prompt count="2">
          <audio expr="MP.prompt2init_aud"><value
expr="MP.prompt2init_txt"/></audio >
          <value expr="curItemTxt"/>
          <audio expr="MP.prompt2cansay_aud"><value
expr="MP.prompt2cansay_txt"/></audio >
          </prompt>
          <!-- proposed VXML extension: dynamic grammar
-->
          <grammar src="javascript:MP.grammar"/>
          <help                  count="1"><audio
    expr="MP.help1aud"><value
expr="MP.help1txt"/></audio></help>
          <help                  count="2"><audio
    expr="MP.help2aud"><value
expr="MP.help2txt"/></audio></help>
          <nomatch                count="1"><audio
    expr="MP.nomatch1aud"><value
expr="MP.nomatch1txt"/></audio></nomatch>
          <nomatch                count="2"><audio
    expr="MP.nomatch2aud"><value
expr="MP.nomatch2txt"/></audio></nomatch>
          <noinput                count="1"><audio
    expr="MP.noimp1aud"><value
expr="MP.noimp1txt"/></audio></noinput>
          <noinput                count="2"><audio
    expr="MP.noimp2aud"><value
expr="MP.noimp1txt"/></audio></noinput>
          <error><audio exp="MP.errorAud"><value
expr="MP.errorTxt"/></audio><exit/></error>
        <filled>
          <if cond="navSelect==MP.selGram[MP.next]">
            <if cond="curSelIndex<maxSelIndex">
              <assign name="curSelIndex" expr="curSelIndex+
                1"/>
            <else/>
              <assign name="curSelIndex" expr="0"/>
            </if>
          <else/>
            <if  cond="navSelect  ==MP.selGram[MP.previ-
                ous]">
              <if cond="curSelIndex>0">
                <assign             name="curSelIndex"
                  expr="curSelIndex-1"/>
              <else/>
                <assign             name="curSelIndex"
                  expr="maxSelIndex"/>
              </if>
            <else/>
              <if  cond="navSelect  ==MP.selectGram[MP.se-
                lect]">
                <assign   name="result"    expr="MP.selTxt
                  [curSelIndex]"/>
              <else>
                <assign name="result" expr="navSelect"/>
              <</if>
              </if>
            </if>
          </if>
          <if cond="result!=' '">
            <return namelist="result"/>
          <else/>
            <assign name="navSelect" expr="undefined"/>
            <assign name="setActPrompt" expr="undefined"/
                >
          </if>
          <prompt><audio exp="MP.filledAud"><value
expr="MP.filledTxt"/></audio></prompt>
        </filled>
      </field>
    </form>
</vxml>
```

The following code (simpDate.js) illustrates a parameter oject declaration for the simpDate reusableVoiceXML dialog component.

```
function simpDate(
){
```

```
// internal variables
this.mainPromptTxt='Please select a date.';
this.helpTxt=this.mainPromptTxt;
this.nomatchTxt='I didn\'t understand you. '+this.main-
    PromptTxt;
this.noimpTxt='I didn\'t hear you. '+this.mainPromptTxt;
// optional properties
this.prompt1_txt='please select a date.';
this.prompt1_aud='FAKE';
this.prompt2_txt='';
this.prompt2_aud='FAKE';
this.help1txt=this.helpTxt;
this.help2txt=this.helpTxt;
this.help1aud='FAKE';
this.help2aud='FAKE';
this.nomatch1txt=this.nomatchTxt;
this.nomatch2txt=this.nomatchTxt;
this.nomatch1aud='FAKE';
this.nomatch2aud='FAKE';
this.noimp1txt=this.noimpTxt;
this.noimp2txt=this.noimpTxt;
this.noimp1aud='FAKE';
this.noimp2aud='FAKE';
this.filledTxt='';
this.filledAud='FAKE';
this.errorTxt='Sorry, must exit due to an execution error.
    Call back later, please.';
this.errorAud='FAKE';
```

The following code (simpNavMenu.js) illustrates a parameter object declaration for the simpNavMenu reusable VoiceXML dialog component:

```
function makeFullPrompt (p_prompt, p_list1, p_list2) {
    var fullPrompt=p_prompt;
    for (var index in p_list1) {
        fullPrompt=fullPrompt+p_list1[index]+'. ';
    }
    fullPrompt=fullPrompt+'or';
    for (var index in p_list2) {
        fullPrompt=fullPrompt+p_list2[index]+'. ';
    }
    return fullPrompt
}
function makeFullGram(base, p_list1, p_list2, trailer) {
    var fullGram='';
    for (var index in p_list1) {
        fullGram=fullGram+p_list1[index]+'|';
    }
    for (var index in p_list2) {
        fullGram=fullGram+p_list2[index]+'|';
    }
    // remove trailing separator
    if (fullGram !='')
        fullGram=base+fullGram.substring(0,fullGram-
            .length−3)+trailer;
    return fullGram
}
function simpNavMenu(
    p_selTxt
) {
    // methods
    this.mFPrompt=makeFullPrompt;
    this.mFGram=makeFullGram;
    // constants
    this.next=0;
    this.previous=1;
    this.select=2;
    // mandatory properties
    this.selTxt=p_selTxt;
    // optional property
    // VERY SIMPLE: only three navigation phrases are possible
    // they must be specified in this fixed order
    this.selGram=new Array('next', 'previous', 'select');
    // internal variables
    this.promptCurr_txt='Your current selection is:';
    this.helpTxt=this.mFPrompt('You can say: ', p_selTxt,
        this.selGram);
    this.nomatchTxt='I didn\'t understand you. '+this.
        helpTxt;
    this.noimpTxt='I didn\'t hear you. '+this.help.Txt;
    // dynamic grammar source
    this.grammar=this.mFGram('grammar       GR;\npublic
        <top>=', p_selTxt, this.selGram, ';\n');
    // optional properties
    this.prompt1init_txt='Please select a cultural event.';
    this.prompt1curr_txt=this.promptCurr_txt;
    this.prompt1cansay_txt='';
    this.prompt1init_aud='prompt1init.wav';
    this.prompt1cansay_aud='prompt1cansay.wav';
    this.prompt2init_txt='';
    this.prompt2curr_txt=this.promptCurr_txt;
    this.prompt2cansay_txt='';
    this.prompt2init_aud='prompt2init.wav';
    this.prompt2cansay_aud='prompt2cansay.wav';
    this.help1txt=this.helpTxt;
    this.help2txt=this.helpTxt;
    this.help1aud='help1aud.wav';
    this.help2aud='help2aud.wav';
    this.nomatch1txt=this.nomatchTxt;
    this.nomatch2txt=this.nomatchTxt;
    this.nomatch1aud 'nomatch1aud.wav';
    this.nomatch2aud 'nomatch2aud.wav';
    this.noimp1txt=this.noimpTxt;
    this.noimp2txt=this.noimpTxt;
    this.noimp1aud='noimp1aud.wav';
    this.noimp2aud='noimp2aud.wav';
    this.filledTxt='';
    this.filledAud='filledAud.wav';
    this.errorTxt='Sorry, must exit due to an execution error.
        Call back later, please.';
    this.erorAud='errorAud.wav';
}
```

An exemplary grammar file (simpDate.gram) shown in Appendix A, specifies the associated Dategrammar file.

Preferably, to implement reusable VoiceXML dialog components within the VoiceXML specifications, a VoiceXML platform should support (i) dynamic grammar generation and (ii) passing audio as a variable. Currently, VoiceXML does not support dynamic grammar generation. In one preferred embodiment, a grammar is dynamically compiled outside of the VoiceXML interpreter. For example, <grammar src="javascript:MP.grammar"/> in simpComponent.vxml can be replaced by: <grammar src=" http://www.grammar_generator.example/dynamiccompiler?MP.grammarfURI"> or <grammar src="http://localhost/dynamiccompiler?MP.grammarfURI">, depending on whether the compiler is on a server or local.

The MP.grammarfURI is a javascript function that converts the grammar parameters in an URI compliant form. Other plug-in mechanisms may be employed.

In accordance with the present invention, it is preferred that a VoiceXML specification be added for dynamic grammar generation. Indeed, dynamic grammar generation is needed for template type reusable VoiceXML dialog components as illustrated by simpNavMenu.vxml. Moreover, there are task reusable VoiceXML dialog components that may be difficult to implement without dynamic-grammar support, e.g. spoken-and-spelled name.

VoiceXML 2.0 supports the ability to pass audio as variable. This feature is useful for implementing audio prompts. Currently, with VoiceXML 1.0, the prompts must be generated outside the VoiceXML interpreter and passed by URI similarly to the dynamic grammar case.

There are numerous advantages associated with the framework discussed above using reusable VoiceXML dialog components. One advantage is that the reusable VoiceXML dialog components are browser independent and do not require any change to existing browsers (except for the new VoiceXML requirements proposed herein). Further, the task of authoring complex reusable dialog components and modules is left to the skilled VoiceXML programmers (e.g., VoiceXML reusable dialog components, associated ECMAScript parameter object files and associated default grammars and prompts). Moreover, developers who use the reusable VoiceXML dialog components can use such components as libraries or as sample code/templates to build more complex applications and reusable VoiceXML dialog modules or customize them.

In other words, reusable VoiceXML dialog components will allow users to learn from and re-use standard components as they get deployed. This will have the same impact on easing learning and adoption as was seen with HTML where users could see how a certain page was written when authoring their sites. Similarly, the use of reusable VoiceXML dialog components will be instrumental in the growth of voice applications.

Another advantage is that the reusable VoiceXML dialog component framework described above meets the W3C VoiceXML and reusable dialog component specifications and recommendations. Further, internationalization and localization can be supported by providing different versions of the reusable VoiceXML dialog components and adapting the parameter object files accordingly. This can be provided in the above mentioned libraries or repositories or the components can easily be adapted by a developer starting from the sample reusable VoiceXML dialog components. These are examples of reusable VoiceXML dialog modules as noted above.

The simultaneous activation of the components is currently a feature beyond the scope of VoiceXML. In accordance with the present invention, however, mechanisms are provided to support this feature (e.g., mixed initiative and free flow dialog) as discussed below.

Furthermore, in a reusable VoiceXML dialog component framework as described above, return values support the NL formats, error/exception handling are explicitly addressed (as illustrated in the skeleton and examples above), prompts are set as part of the associated parameter object file and the associated error and exception handling logic is explicitly implemented in the reusable VoiceXML dialog components. The present invention supports coordination between language and component features since the reusable VoiceXML dialog components are declarative and the behavior can be immediately determined by direct examination. Further, staying within the VoiceXML framework guarantees a well predictable scoping of global commands. In addition, to provide a consistent user experience, it is preferred that a reusable dialog component framework according to the present invention follows scopes as for subdialogs. Component composition is also supported as described earlier and further because of the declarative nature of the reusable VoiceXML dialog components and modules.

Further, with respect to the W3C updated requirement proposal, reusable VoiceXML dialog components according to the present invention preferably support: (i) returning the control to the calling routine after execution of the component (by design of subdialogs); (ii) multiple invocation; (iii) multiple application can point to the same subdialog; (iv) reusable component can be configured at execution through an associated ECMAScript parameter object and no compilation is required except for grammar compilation as discussed earlier; (v) the interface is clearly standardized through the result object and the ECMAScript parameter object; and (vi) platform dependency is trivially determined by inspection of a reusable VoiceXML dialog component: if the reusable component does not contain an <object > tag, it is platform-independent but if the reusable component does contain an <object > tag, then another framework as described herein may be implemented.

The requirement for simultaneous/parallel activation of the components is more complex and is currently a feature that is currently beyond the scope of VoiceXML and currently addressed herein through shared grammars across form items. This feature is discussed in detail below (e.g., mixed initiative and free flow dialog) wherein mechanisms are added to the existing W3C requirements to support mixed initiatives: context sharing across reusable dialog components (subdialogs as well as objects).

When developing client-side VoiceXML applications, it may be difficult to build a voice-based application without access to dynamic data sources like dynamic grammar compilation and dynamic access to databases (via HTTP server or by ODBC, SQL, etc. . . . ). In accordance with the present invention, components and mechanisms are provided to access dynamic data sources.

B Reusable VoiceXML Dialog Beans

In addition to building client-side reusable VoiceXML dialog components and modules that satisfy the existing VoiceXML framework using existing VoiceXML browsers and web infrastructures, in accordance with another embodiment of the present invention, server-side solutions with dynamic generation of the VoiceXML pages are preferably employed to support dynamic manipulation of prompts, dynamic grammar compilation and dynamic access to data sources .

A common issue with server side reusable dialog components is the selection of a programming language—environment (Java, Perl, Python, PHP, C, VisualBasic, . . . ). In a preferred embodiment, the dialog component library is programming language agnostic in order to achieve wide acceptance and reusability. There are several interlingual frameworks that allow integration of software components that are implemented in different programming languages. Some of them are limited to MS Windows (COM, .NET runtime), some are limited to Linux Gnome (Bonobo), but other are platform independent (CORBA Components, UNO, XPCOM). Because inter-process communication is not necessary for the reusable dialog components, UNO and XPCOM seem to be more suitable for this task.

Figure 2:
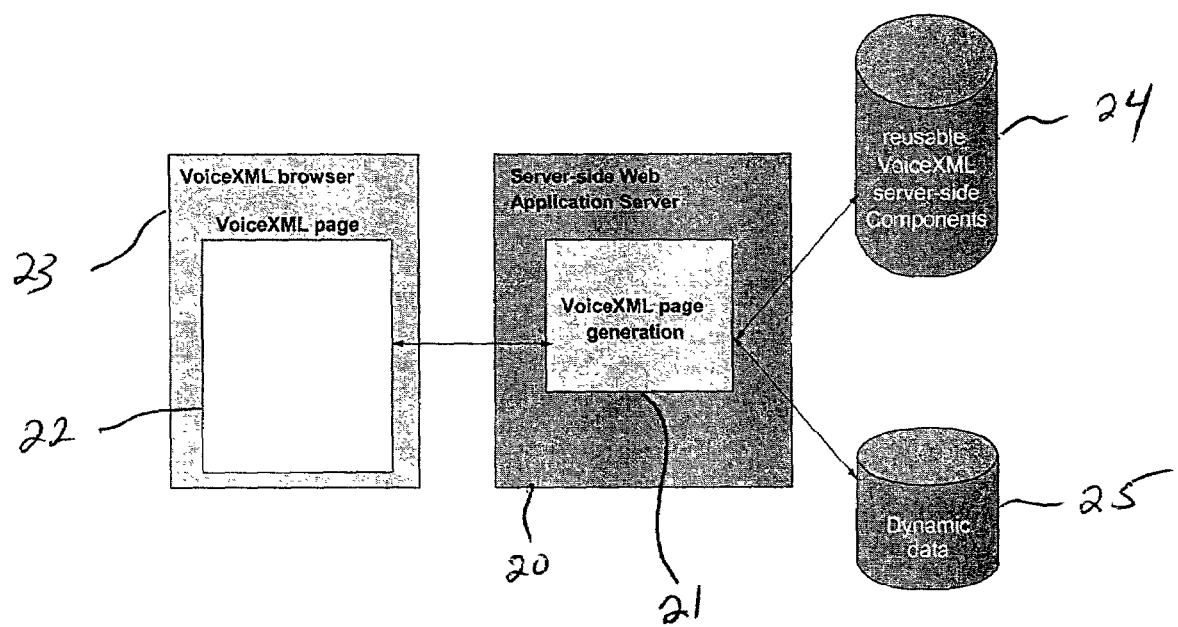
FIG. 2 is a diagram of a system and method for implementing reusable VoiceXML dialog components according to another embodiment of the present invention.

FIG. 2 is a diagram of a system and method for implementing reusable VoiceXML components according to another embodiment of the present invention using a server-centric framework. Generally, the server-centric framework in FIG. 2 comprises a Web application server 20 comprising a page generation module 21. The page generation module 21 dynamically generates a VoiceXML page 22 that is processed by a VoiceXML browser 23. To build a VoiceXML page, the page generation module 21 accesses (i) reusable VoiceXML server-side components from repository 24 and/or (ii) dynamic data from database 25.

In general, a method for server-side generation of a VoiceXML page according to one aspect of the invention comprises the following steps. Initially, an intermediate VoiceXML code is constructed using predefined reusable dialog components 24. Then, data from the dynamic data sources 25 is inserted into the intermediate code. Finally, the resulting pure VoiceXML code (with or without <object> or <subdialog> elements) is sent to the browser 23.

It is to be appreciated that various methods may be used for implementing server-side reusable VoiceXML dialog components. For instance, server-side reusable VoiceXML dialog components may comprise VoiceXML objects that are created by reusing the client-side reusable VoiceXML dialog components and modules as described above in Section IIA. Further, in another VoiceXML framework, the VoiceXML objects may comprise beans, whereby a markup template processing engine (e.g., JSP(JavaServer Pages), ASP(Active Server Page), PHP(Personal Home Page Tools)) provides a framework to dynamically generate the VoiceXML pages using the beans. In addition, as explained below, service beans can be used to dynamically compile grammars and dynamically manipulate prompts.

In a preferred embodiment of the present invention, the server-centric framework illustrated in FIG. 2 comprises a JSP reusable VoiceXML beans framework, where the beans are similar in function to the client-side reusable VoiceXML dialog components (or modules) as discussed above. The details of a preferred JSP/beans framework are described in, e.g., U.S. patent application Ser. No. 09/837,024, filed on Apr. 18, 2001, entitled "Systems and Methods For Providing Conversational Computing Via JavaServer Pages and Javabeans", which is commonly assigned and incorporated herein by reference. Generally, JSP is method for controlling the content or appearance of Web pages through the use of servlets, which are small programs that are specified in the Web page and run on the Web server to modify the Web page before it is served to a requesting client. U.S. Ser. No. 09/837,024 describes a server-centric solution based on Java Server Pages (JSP) with embedded reusable VoiceXML dialog beans (JavaBeans), wherein VoiceXML pages are dynamically generated by JSPs that call beans. Beans are classified as (1) VoiceXML dialog beans that generate VoiceXML subdialogs (a simple framework can generate all the reusable dialog components enumerated in the W3C reusable dialog component requirements) and (2) service beans that perform other system tasks (such as dynamic access to backend (via HTTP server or by ODBC, SQL, etc. . . . ), determination of client properties, compilation of dynamic grammars etc).

The following skeleton example describes the use and call of reusable VoiceXML dialog beans. In particular, the following JSP skeleton page (component_vxml.jsp) is responsible for creating and rendering reusable VoiceXML dialog beans:

<%@page session="true" language="java" contentType="text/vxml" %><?xml version="1.0"?>
<!—The application business logic makes sure that the Form container contains the DSlot speech object, such that calling renderFace ( ) on the Form renders the VoiceXML content of the DSlot date bean.—>
<jsp:useBean id="component" scope="session" class="example.vxmlserver.ui.Form"/>
<vxml version="2.0">
<% component.renderFace(out); %>
</vxml>

In JSP/beans framework, reusable VoiceXML dialog beans are embedded in JSP pages that are responsible for bean creation and rendering. Since a full-fledged object-oriented procedural language (Java) is used for implementing the server-side reusable VoiceXML dialog beans, the speech objects are readily reusable through inheritance or aggregation. Preferably, the rendering follows a MVC (Model-View-Controller) paradigm, where the UI renderers, acting as Views, encompass markup-specific rendering code (renderFace) and the Model maintains the modality-independent state of the object. Each bean comprises a "rendering face" for each modality supported by the server, which allows each bean to return its results (in response to a JSP request) in the appropriate modality. A Database stores the object instances and data associated with the various beans.

The "rendering face" of a given bean comprises a method that inspects (by introspection) the type of channel used for access and then, upon determining the channel type, e.g., VoiceXML access, the rendering face method returns a VoiceXML portion of the user interface to embed in the calling JSP (and in the VoiceXML pages) that the JSP dynamically generates.

Figure 3:
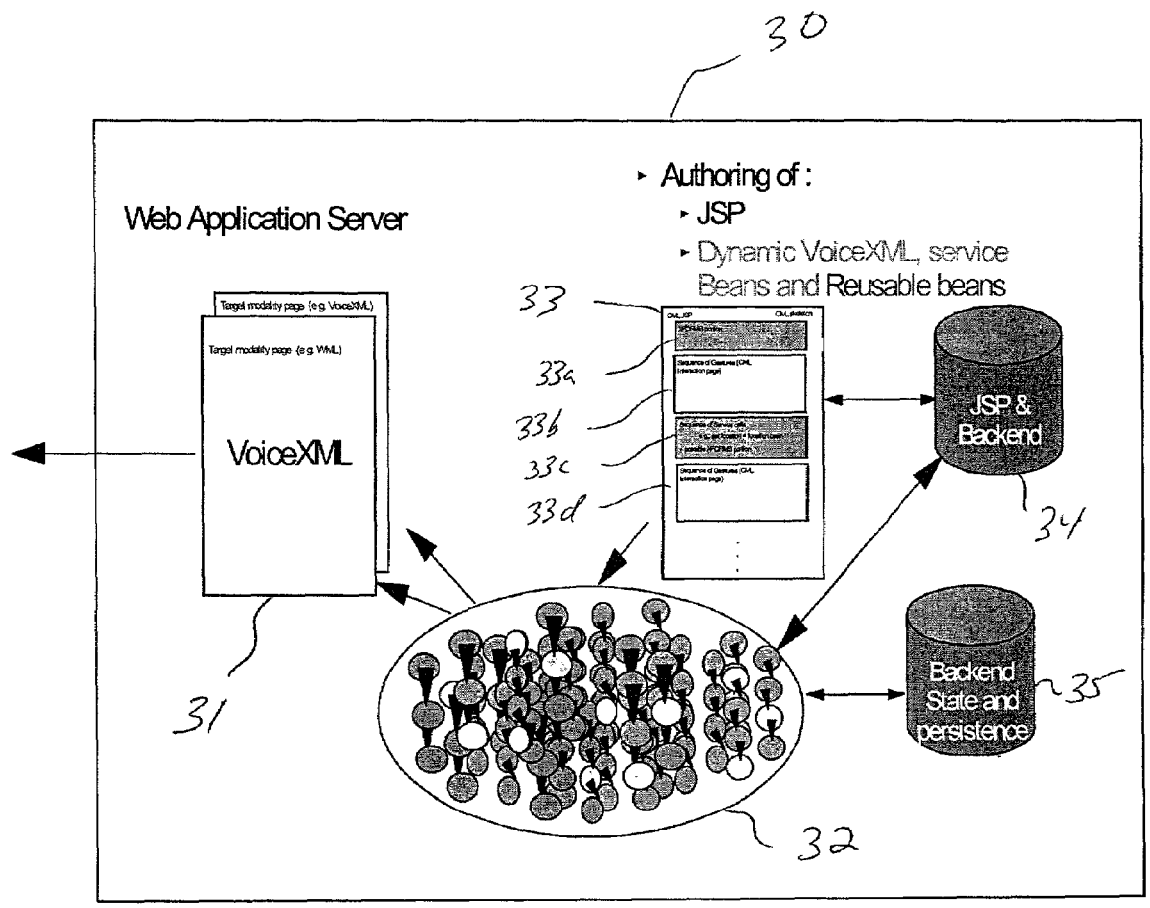
FIG. 3 is a diagram of a system and method for implementing reusable VoiceXML dialog components using JSP (JavaServer Pages) and beans according to an embodiment of the present invention.

FIG. 3 illustrates a system and method for implementing VoiceXML beans according to the present invention. In FIG. 3, a web application server 30 generates modality-specific pages 31 (e.g., VoiceXML pages). The Web application server 30 comprises a database 32 of reusable service beans and reusable dialog beans having rendering faces for VoiceXML. The VoiceXML pages 31 are dynamically generated by compiling a CML (conversational markup language) JSP page 33 using a CML skeleton framework and the beans 32. Database 34 stores CML JSP pages 33 and backend content and business logic for the applications. Database 35 stores the object instances and data associated with the various beans 32.

More specifically, in the framework of FIG. 3, authoring begins with drafting a CML (conversational markup language) skeleton associated with a CML-JSP page 33. Preferably, the CML skeleton comprises program code that represents a document/application in a single authoring, modality-independent manner. The CML skeleton is generated and stored, e.g., in the database 34. In a preferred embodiment, CML comprises an interaction-based, modality-independent framework for building multi-modal applications. One embodiment of an interaction-based programming model that may be implemented herein is described, for example, in U.S. patent application Ser. No. 09/544,823, filed on Apr. 6, 2000, entitled: *"Methods and Systems For Multi-Modal Browsing and Implementation of A Conversational Markup Language"*, which is commonly assigned and fully incorporated herein by reference. In general, U.S. Ser. No. 09/544, 823 describes a new programming paradigm for an interaction-based CML (conversational markup language) in which the application content (business logic and backend access) is separate from user interaction (CML is now referred to as iML (interaction markup language). More specifically, the CML programming model separates application programming into content aspects, presentation aspects and interaction aspects. IML preferably comprises a high-level XML-based language for representing "dialogs" or "conversations" between user and machine, which is preferably implemented in a modality-independent, single authoring format using a plurality of "conversational gestures." Conversational gestures comprise elementary dialog components (interaction-based elements) that characterize the dialog interaction with the user and are bound to the data model manipulated by the user. Each conversational gesture provides an abstract representation of a dialog independent from the characteristics and UI offered by the device or application that is responsible for rendering the presentation material. In other words, the conversational gestures are modality-independent building blocks that can be combined to represent any type of intent-based user interaction. A gesture-based IML, for example, allows an application to be written in a manner which is independent of the content/application logic and presentation (i.e., gesture-based IML encapsulates man-machine interaction in a modality-independent manner).

The exemplary CML JSP page 33 comprises a plurality of components (program code modules) such as an XFORMS portion 33a (generally, a data model declaration), various sequences of gestures 33b, 33d (CML interaction pages that call gesture beans) and a sequence of service calls 33c (which call service beans). In a hybrid case, the CML JSP page 33 may also comprise some object calls. It is to be understood that the sequence and use of such components will vary for a given CML JSP page based on the application. The XFORMS component 33a of the CML JSP page 33 specifies one or more data models for user interaction. The XFORMS component 33a of the CML JSP page 33 declares a data model for the fields to be populated by the user interaction that is specified by the one or more gestures 33b, 33d. In other words, the CML interaction page 33b, 33d can specify the portions of the user interaction that is binded on the data model portion 33. XForms is compatible and supports XSchema, which may be implemented herein. It is to be understood that other languages that capture data models and interaction may be implemented herein.

Those portions of the CML skeleton comprising the sequences of gestures 33b, 33d comprise code (scripts, tags, etc.) that access/call corresponding gesture beans in the database 32. In one embodiment, the database 32 comprises a finite set of gesture beans, wherein the set of gesture beans comprises at least one gesture bean for each of the fundamental CML conversational gestures described in the above-incorporated U.S. Ser. No. 09/544,823, and possibly a finite set of reusable dialog components that are built from the elementary finite set of gesture beans.

Furthermore, the gesture beans 32 may comprise one or more inherited gesture beans that are generated from corresponding gesture beans. An inherited gesture bean may be used to provide cosmetization or specialized rendering in a target ML associated with the corresponding gesture bean. Cosmetization or specialization is a method for optimizing an application for a given channel (device, modality or browser) or a class of channel (e.g., Nokia cell phones, etc.). For example, specialization may includes providing a background for a page, changing the layering of a page into frames, fragmenting a WML document across multiple deck of cards, specifying the voice characteristics for a TTS prompt or an audio prompt to play back, changing the message to present to the user when spoken versus the displayed message, skipping a gesture not needed in a given modality, etc. This concept is analogous to cosmetized XSL rules for the conversational gestures as described in the above-incorporated U.S. Ser. No. 09/544,823.

Next, those portions of the CML JSP page 33 that correspond to sequences of service calls 33c comprise program code that are specified as service bean calls. Preferably, the programming model for the service beans is imperative (i.e., the conventional model), although any suitable constrained model may be implemented. In addition, unlike the set of gesture beans which is preferably limited, the number of service beans that may be employed is unlimited. The service beans are employed to, e.g., provide access to dynamic data, provide access to the backend legacy content, provide a mechanism to maintain dialog states, etc. Server beans comprise a rendering component which, as explained below, allows the service call to be rendered in CML (and possibly a XFORMS) format. In other words, the service beans preferably produce CML and/or XFORMS page portions (including possible calls to gesture beans) that are inserted in the resulting CML-JSP page prior to rendering of such page.

There are various advantages associated with a framework based on reusable VoiceXML dialog beans as shown in FIG. 3. For instance, the reusable VoiceXML dialog beans are browser independent and do not require any change to existing browsers. Further, the authoring of complex reusable dialog components and modules is left to skilled VoiceXML programmers (e.g., authoring of reusable VoiceXML dialog beans (VoiceXML renderers, data models and backend implementation) and grammar files. Another advantage is that developers who use the reusable VoiceXML dialog bean just need to author VoiceXML templates (JSPs, ASPs, PHPs) that call the rendering code of the reusable VoiceXML dialog beans as they can involve other service beans. The beans framework exploits the servlet paradigm for web servers/web application servers. As such it directly fit into numbers of robust and scaleable web/e-business infrastructures.

Further, the use of the MVC principle enables extension of the application authoring to multi-channel and multi-modal applications. In addition, a beans framework and server side application can maintain context and enable context sharing and dialog flow control. Therefore, this framework is ready to support mixed initiative applications when available.

Another advantage is that reusable VoiceXML dialog beans will allow users to learn from and re-use standard components as they get deployed, which will lead to the growth of voice applications.

Further, no extensions are required for voice browser or VoiceXML with the server-side VoiceXML generation approach and the reusable VoiceXML dialog beans discussed above. A reusable VoiceXML dialog bean framework satisfies the requirements and recommendations of the W3C speech framework.

III. Dialog Object Interfaces and Behaviors

This section addresses the use of the <object> tag within Voice XML for encapsulating dialog elements and other service calls whose behavior is implemented via platform-specific objects, and enumerates some requirements to ensure that the component framework used for dialog objects enables rich context sharing amongst various dialog components comprising a conversational application. It is to be understood that this discussion goes beyond the current VoiceXML 2.0 specifications and execution model.

In accordance with an embodiment of the present invention, a framework is provided for context sharing objects and subdialogs to support their parallel activation and mixed initiative across objects, subdialogs and documents. This functionality is preferably achieved by using "re-entrant" objects and or subdialog, meaning that objects and subdialogs can be initiated, interrupted, inspected and resumed with a partially filled result/state object. These frameworks require extensions of the VoiceXML specification, the form interpretation algorithm and the VoiceXML execution model. These frameworks provide support for advanced mixed initiative beyond current VoiceXML specification that allow mixed initiative for fields of a same form or within a same document.

In the VoiceXML framework, the <object> element is used to expose platform-specific functionality for use by a VoiceXML application. A <param> element can be used to pass parameters to the <object> when it is invoked. When an <object > is executed, it returns an ECMAScript result object as the value of its form item variable.

The use of reusable VoiceXML dialog components as described in the previous section support standard VoiceXML implementations. In view of the reusable VoiceXML dialog component frameworks presented above, it is preferred that the use of binary objects (i.e., non-declarative VoiceXML) be limited as much as possible to the implementation of functions or behaviors not supported by VoiceXML so as to maintain browser interoperability. For example, <object > can be used to implement speaker recognition functions as enrollment, verification and identifications, and other functions not currently supported by VoiceXML.

Similarly, it is preferred that dialog modules which only use functions supported by VoiceXML rely on the reusable VoiceXML dialog component and module framework described above or the server-side beans framework to remain within the VoiceXML specifications.

A. Object Types

There are various type of objects that are classified as "service objects" and "interaction objects". Service objects comprise objects that do not process the dialog with the user to affect the dialog, but can rather affect the state of the dialog, the state of the application or the state of the platform (client or server) or they can process the dialog with no direct impact on this dialog other than confirmation of success, failure or completion. Examples of service objects include, e.g., objects that check the caller ID, check the time of the call, pre-populate a dialog form based on information known about the user or record and log a whole conversation (as compared to the <record>) function.

Service objects also provide dynamic access to data sources (via HTTP server or by ODBC, SQL, etc . . . ). The required functionality of dynamic data source access objects makes it virtually impossible to develop such access objects using VoiceXML. Therefore, consideration should be given to using some native programming language—preferably the same as the language that the VoiceXML browser is written in. It is also possible to imagine these objects as similar to browser plug-ins.

The current VoiceXML <object> specifications seem adequate to support such services objects. Service objects are similar to the service beans as described above with reference to FIG. 3 in a reusable VoiceXML dialog beans framework.

Further, interaction objects comprise objects that directly process dialogs with the user. Interaction objects can be further classified into "dialog module" objects and "I/O processing" objects. Dialog module objects comprise objects that provide partial dialog and dialog logic to populate a set of fields. They can provide functions analogous to the reusable VoiceXML dialog components or modules as defined above, except that their internal execution model does not have to be limited to the VoiceXML execution model and capabilities. For example, a speech biometric verification dialog module can provide verification of a user simultaneously based on acoustic verification (speaker verification) and content verification (acceptance of the answers to questions).

It is to be noted that the reusable VoiceXML dialog components (as well as the beans) discussed above is analogous to the dialog module object type, using the <subdialog> tag instead of <object>. Therefore, in accordance with one embodiment of the present invention, the expected behavior of both elements is closely linked.

I/O processing objects comprise objects that process user inputs and output to the user and populate a set of fields without carrying any dialog or partial dialog with the user or process <param> to produce and output to the user. Examples of I/O processing objects include, e.g., a speaker identification I/O processing object that performs text-dependent or text-independent speaker identification or an NLG (Natural Language Generation) processing object that generates the prompt to feed to a TTS engine on the basis of a set of attribute value pairs through <param>.

Interaction objects bring more demanding requirements. Because of the similarity between interaction objects and the subdialogs as described above in the reusable VoiceXML dialog component framework, we will discuss issues with execution flow, the form interpretation algorithm, etc. for both <subdialog> and <object> tags.

Preferably, to support mixed initiative according to the present invention, interaction objects and subdialogs preferably support parallel activation (e.g., objects that can process the next I/O event). Consequently, in accordance with the present invention, mechanisms are preferably implemented to (i) decide what object or objects process a given event (ii) share events and state (context) between objects and to (iii) switch between running objects and pass from one dialog to another (e.g., Stop or interrupt an object and save its state, access to state, launch an object in a prescribed state, etc.). This goes beyond the level of parallel activation described in the updated W3C reusable dialog component requirements, where parallel activation would not play beyond the first prompt or entry point in the object.

Further, to support mixed initiative, interaction objects and subdialogs preferably support the use of expert systems to improve processing of particular dialog situations and therefore base a portion of an interaction object on the result of another object that was running in parallel.

In addition, some level of support is preferred for multi-channel and multi-modal rendering. For example, with the JSP/bean approach, the use of the MVC principle and a renderFace function enables to reuse the same beans across multiple channel (multi-channel applications) with possible synchronization of these channels (multi-modal applications): renderFace (out, getModality ( ), cp); where getModality ( ) returns the access channel(s) and cp describes the client profile (this can be based on the W3C CC/PP working group deliverables).

Figure 4:
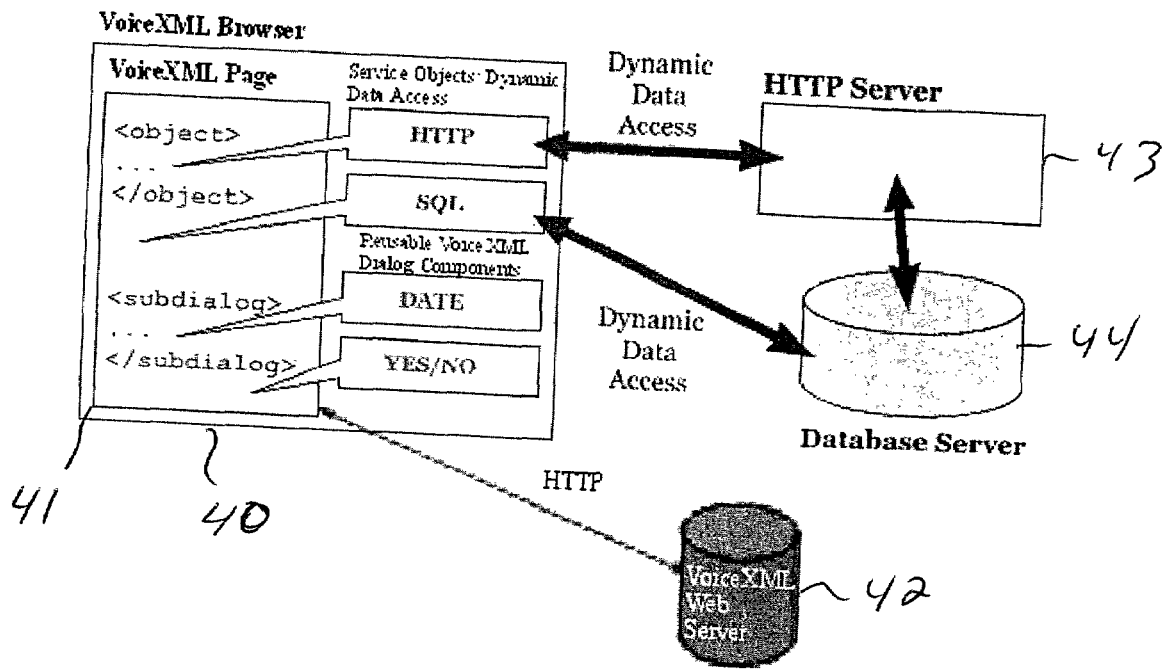
FIG. 4 is a diagram of a system and method for implementing reusable VoiceXML dialog components according to another embodiment of the present invention.

FIG. 4 is a diagram of a client-centric framework implementing service objects for dynamic access to data sources as well as interaction objects and subdialogs. A VoiceXML browser 40 processes a VoiceXML page 41 (received from VoiceXML web server 42). The VoiceXML script comprises a plurality of <object> and <subdialog> elements. The <object> elements call service objects (as well as interaction objects) for dynamic data access via, e.g., HTTP to an HTTP server 43 or SQL (structured query language) to a database server 44. The <subdialog> components call interaction objects (reusable VoiceXML components).

B. Execution and Navigation Flow Issues

To illustrate the impact of the above requirements, consider the VoiceXML mixed initiative specifications—to make a form mixed initiative, where both the computer and the human direct the conversation, the form must have one or more <initial> form items (which controls the initial interaction in a mixed initiative form) and one or more form-level grammar (which allows the fields of a form to be filled in any order and allows more than one field to be filled as a result of a single utterance).

This works well for <field> as form items. It does not work for binary <object> (e.g., interaction objects) or <subdialog> as form items, when mixed initiative is expected across objects (instead of intra-objects). Indeed, as specified in the VoiceXML forum, once entered, an object must complete before returning the hand to the VoiceXML interpreter.

Figure 5:
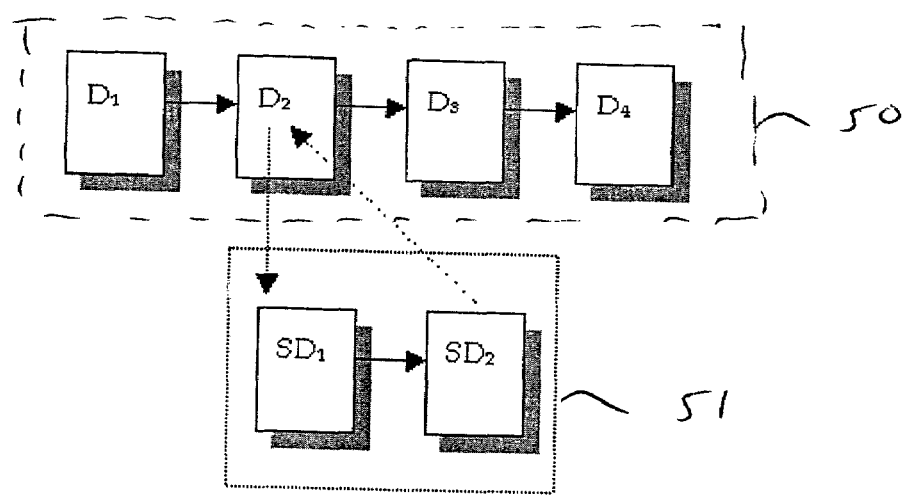
FIG. 5 is a diagram illustrating an execution flow of an invoked subdialog according to current VoiceXML specifications.

FIG. 5 illustrates the execution flow when invoking a subdialog composed in multiple documents as provided in the VoiceXML 2.0 specifications. FIG. 5 shows the execution flow of application where a sequence of documents D transitions to a subdialog SD and then back. The main dialog execution context 50 comprises documents D1-D4 and the subdialog execution context comprises documents SD1 and SD2. A subdialog invocation occurs in document D2, wherein the subdialog executes via documents SD1 and SD2, and returns after execution. In this execution model, the calling dialog is suspended (the execution context in dialog D2 is suspended) when it invokes the subdialog SD1, awaiting return of information from the subdialog. As such, the execution flow in FIG. 5 does not support mixed initiative that would free the navigation flow between SD1, SD2 and D2. For example, there is no known VoiceXML specification for allowing the user to input form items relative to D2 while interacting with SD1.

Indeed, the existing VoiceXML specifications only indicate that if a form has form-level grammars, its fields can be filled in any order and that more than one field can be filled as a result of a single user utterance. Further, the form's grammars can be active when the user is in other dialogs. If a document has two forms on it and both forms have grammars that are active for that document, a user could respond to a request from one form with information about the other, and thus direct the computer to talk about the second form instead. The user can speak to any active grammar, and have fields set and actions taken in response.

This mechanism enables mixed initiative only within a document and relies on the "scope" of active grammars to decide the form item activated by a given user input. However, this mechanism does not provide for mixed initiative across documents, nor does it provide a mechanism for exiting form items that have their own execution flow before completion of the dialog flow.

We have identified various issues with the current VoiceXML specifications:

(1) <object>: when an object is running and carrying a dialog with the user (whether the object is a dialog module object or I/O processing object), only errors can interrupt the execution flow;

(2) <subdialogs>: When a subdialog is interpreted, the only active grammars are those in dialog-scope of the subdialog and the default grammars defined by the interpreter context (e.g. help, cancel). The set of active grammars remains limited for all subsequent dialogs until a <return> is executed. As explained below, to support mixed initiative in accordance with the present invention, a mechanism is preferably provided for sharing and aggregating the parent form grammar with its subdialog.

Further issues of the current VoiceXML specifications are that the <record> and <transfer> behavior is uncertain when mixed initiative is to be supported such functions can not be escaped by the user (for example during bridging, before returning to the interpreter), or combined with another query. Further, with respect to <block> behavior, it is unclear whether or not there can be mixed initiative between block form items and the other form items of the parent form.

The execution model for objects is not specified in the current version of VoiceXML 2.0 as they are essentially platform specific. Because objects are a priory binaries, not available to inspection by the VoiceXML interpreter, it is not possible to simply extend the grammar scope and execution flows as we could do with subdialogs.

C. Re-Entrant Objects

Therefore, in accordance with the present invention, to support mixed initiative, objects and subdialogs (e.g., the next generation of reusable VoiceXML dialog components or modules) are preferably "reentrant" or support "re-entrant" behavior and interfaces.

In accordance with one aspect of the present invention, a re-entrant object or subdialog is one that supports launch with a partially filled state. More specifically, an ECMAScript result object can be manipulated prior to launching the object and partially filled. Further, the object initiated in its partially filled state (i.e. result object), has an execution flow that allows it to continue to collect the missing members of its result object. A result object according to the present invention differs from the current specification since, e.g., the result object may comprise a description of the full relevant internal state of the object (rather than just the final return values).

Further, a re-entrant object or subdialog is one that supports an execution_flag that prescribes if the object should:

(i) return its object result only when it is completed (this is the current execution model of subdialogs and probably the common understanding of the execution model of objects, and this could be the default settings for the execution_flag);

(ii) return its object result even when it is partially filled, but a particular event has been triggered (low confidence, error, etc.);

(iii) return its object result or launch an event (this is more an implementation choice) when the internal result object changes; and/or (iv) return its object result or launch a blocking event (this is more an implementation choice) when the internal result object changes (in the latter case, when blocked, it should be possible to get and set the members of the result object and resume the object execution).

Further, when the event approach is followed, the re entrant object or subdialog preferably can launch blocking events, be blocked, support set and get on the members of its result object and allow its execution to be resumed with a modified partially filled result object and continue to collect the missing members of its result object.

In addition a re-entrant object or re-entrant subdialog is one that allows possible I/O sharing through an additional object, e.g., allowing an utterance be passed to other engines associated to other objects for separate processing when needed. This is important if parallel objects use different engines or different data files and properties. This can be done as member of the result object.

Re-entrant objects should now throw not only error.unsupported.object if the particular platform-specific object is not supported, but throw an analogous error.unsupported.object. execution_flag, if the selected execution flag is not supported. Vendors may decide to revert to a default behavior (probably the default execution_flag settings) or wait for the interpreter to handle.

It is to be appreciated that the <subdialog> specifications do not have to be fundamentally modified. To support re-entrance, the present invention adds an execution_flag argument and modifies the execution flow when the execution_flag is not set at its default value. Because of the declarative nature of subdialogs, the manipulation of the result object and capability to handle modified or partially filled result objects can be readily supported with an upgraded VoiceXML interpreter.

There are various advantages to using re-entrant objects and subdialogs. For example, mixed initiative across and between subdialogs, objects and documents becomes possible when supported by the VoiceXML interpreter. Another advantage is that parallel and simultaneously objects and subdialogs can be appropriately supported.

A further advantage is that a user input can be processed through parallel engines. This enables, for example, a speech biometric implementation as described earlier where acoustic and content based authentication are simultaneously performed. Re-entrance also enables to decide on the fly which of a set of parallel engines should process a given input.

It is further possible to involve other expert resources to handle dialog errors in an object or subdialog or condition internal processing of an input on the result of other parallel objects or subdialogs. In addition, context-sharing between modalities, including explicit time-sharing of input events in different modalities becomes possible for multi-modal applications.

Experimental Results

To validate the proposed framework, we have developed a set of re-entrant reusable dialog components using the IBM form-based dialog manager (FDM) as described in the references by Papineni, et al. "Free-flow dialog management using forms", Proc. Eurospeech, Budapest, 1999, and Davies, et al., "The IBM conversational telephony system for financial applications", Proc. Eurospeech, Budapest, 1999. The set of components essentially covers the set of reusable dialog requirements for Voice Markup language (www.w3.org/TR/reusable-dialog-reqs) and a series of transaction-level reusable dialog components. In this setting, the VoiceXML browser simultaneously loads components (<object>) that are loaded with a same activation scope as argument. This goes beyond the current VoiceXML specifications. As VoiceXML does not really specify context sharing, this implementation limits context sharing and mixed initiative between simultaneously activated objects; not between objects and the VoiceXML application. This is a simplification of the application, clearly not a limitation of the framework. Actually, we separately extended support of context sharing between the VoiceXML page and active objects. However, this has architectural implications that go beyond the scope of this application. Components were activated sequentially or in parallel. We did not develop a framework that enables object-oriented composition of the components. This is just a limitation of the FDM as currently implemented; again not a limitation of the framework.

Our implementation demonstrated the sufficiency of the framework to support parallel activation of dialog components. On the other hand, we did not really confirm the usefulness for application developers of a limited set of re-entrant reusable component as in the W3C reusable dialog requirement. Indeed, the use of transaction level re-entrant reusable components quickly appeared more efficient. This may just be because we did not allow building the transaction-level components from the foundation set in the W3C requirements. Because of the commonalties between objects and subdialogs, we consider that this also validated our requirements on VoiceXML subdialogs.

IV. Implementation Summary

With respect to the VoiceXML specifications and dialog reusable components as described herein, it is preferred that support for client-side dynamic grammar compilation be added to the VoiceXML specification. Further, it is preferred that any reusable dialog component framework follows scopes as for subdialogs. In addition, it is preferable to limit the use of binary objects, i.e. non VoiceXML declarative, to the implementation of functions or behaviors not supported by VoiceXML. In addition, dialog modules that only use functions supported by VoiceXML should implement the reusable VoiceXML dialog component and module framework, or its server side bean version, as described herein. Moreover, a mechanism is preferably provided for sharing and aggregating the parent form grammar with its subdialogs. Block behavior under mixed initiative should also be specified.

With respect to future extensions of VoiceXML, service objects are preferably implemented in addition to interaction objects. Such service object should enable dynamic data source access mechanisms (via HTTP (Hypertext Transfer Protocol) servers or by ODBC (Open Database Connectivity), SQL (Structured Query Language), etc). Further, objects and subdialogs are preferably re-entrant or support a re-entrant behavior and interfaces. Moreover, extensions of the VoiceXML interpreter and Form Interpretation Algorithm (FIA) are provided to handle modified or partially filled result subdialogs and objects and support mixed initiative across subdialogs, objects, documents and modalities.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

---

Appendix A: simpDate.gram

```
grammar com.ibm.speech.vxml.grammars_en.date;
// Copyright (c) 2000 IBM Corp. All Rights Reserved.
// The return value is a string, in the format yyyymmdd, yyyymm??, yyyy????,
????mmdd, or ????mm??.
// The grammar will return a "?" in the appropriate positions if the user omits
either the year or day.
public <date> = <dayofmonth> <of_yr> <yr>
                {
                    this.$value = $yr + $dayofmonth;
                    this.$tts = $dayofmonth.$tts + ", " + $yr.$tts;
                }
            |
                <dayofmonth>
                {
                    this.$value = "????" + $dayofmonth;
                    this.$tts = $dayofmonth.$tts;
                }
```

Appendix A: simpDate.gram

```
              |
                <mo> <of_yr> <yr>
                    {
                        this.$value = $yr + $mo + "??";
                        this.$tts = $mo.$tts + " " + $yr.$tts;
                    }
              |
                <yr_of> <yr>
                    {
                        this.$value = $yr + "????";
                        this.$tts = $yr.$tts;
                    }
              |
                <mo_of> <mo>
                    {
                        this.$value = "????" + $mo + "??";
                        this.$tts = $mo.$tts;
                    }
              | <other>
                    {
                        this.$tts = $other.$tts;
                    }
            ;
<dayofmonth> = ( <month29> [the] <ordinal01to29> | [the] <ordinal01to29> [day]
of <month29> )
                    {
                        this.$value=$month29 + $ordinal01to29;
                        this.$tts=$month29.$tts + " " + $ordinal01to29.$tts;
                    }
              | ( <month30> [the] <ordinal01to30> | [the] <ordinal01to30> [day]
of <month30>)
                    {
                        this.$value=$month30 + $ordinal01to30;
                        this.$tts=$month30.$tts + " " + $ordinal01to30.$tts;
                    }
              | ( <month31> [the] <ordinal01to31> | [the] <ordinal01to31> [day]
of <month31>)
                    {
                        this.$value=$month31 + $ordinal01to31;
                        this.$tts=$month31.$tts + " " + $ordinal01to31.$tts;
                    }
            ;
<month29> = february             { this.$value="02"; this.$tts="February" };
<month30> = april                { this.$value="04"; this.$tts="April"; }
          | june                 { this.$value="06"; this.$tts="June"; }
          | september            { this.$value="09"; this.$tts="September"; }
          | november             { this.$value="11"; this.$tts="November"; };
<month31>= january               { this.$value="01"; this.$tts="January"; }
         | march                 { this.$value="03"; this.$tts="March"; }
         | may                   { this.$value="05"; this.$tts="May"; }
         | july                  { this.$value="07"; this.$tts="July"; }
         | august                { this.$value="08"; this.$tts="August"; }
         | october               { this.$value="10"; this.$tts="October"; }
         | december              { this.$value="12"; this.$tts="December"; }
<yr> = <teens> hundred
                    {   this.$value = $teens.$value + "00" ;
                        this.$tts = $teens.$value + "00";
                    }
     | <teens> ( <NULL> | hundred [and] ) <2dNum1to99>
                    {
                        this.$value = $teens.$value + $2dNum1to99;
                        this.$tts = $teens.$value + $2dNum1to99.$value;
                    }
     | ninety <numbers1to9>
                    {
                        this.$value = "199" + $numbers1to9;
                        this.$tts = "199" + $numbers1to9.$value;
                    }
     | two thousand [and] <2dNum1to99>
                    {
                        this.$value = "20" + $2dNum1to99;
                        this.$tts = "20" + $2dNum1to99.$value;
                    }
     | two thousand (zero | oh | nil | null | ought) <numbers1to9>
                    {   this.$value = "20" + "0" + $numbers1to9;
                        this.$tts = "20" + "0" + $numbers1to9.$value;
                    }
```

-continued

Appendix A: simpDate.gram

```
        | two thousand
                    {
                            this.$value = "2000";
                            this.$tts = "2000";
                    }
        | <2dNum1to99> <numbers01to99>
                    {
                            this.$value = $2dNum1to99 + $numbers01to99;
                            this.$tts = $2dNum1to99.$value + $numbers01to99.$value;
                    }
//      | twenty <numbers01to99>
//                  {
//                          this.$value = "20" + $numbers01to99;
//                          this.$tts = "20" + $numbers01to99.$value;
//                  }
        ;
<mo> = <month29>    { this.$tts = $month29.$tts }
     | <month30>    { this.$tts = $month30.$tts }
     | <month31>    { this.$tts = $month31.$tts } ;
<other> = <NULL>
                    { var months = new Array("January", "February", "March", "April", "May", "June",
                                            "July", "August", "September", "October", "November", "December");
                      var days = new Array("First", "Second", "Third", "Fourth", "Fifth", "Sixth", "Seventh", "Eighth", "Ninth",
                                            "Tenth", "Eleventh", "Twelfth", "Thirteenth", "Fourteenth", "Fifteenth", "Sixteenth", "Seventeenth",
                                            "Eighteenth", "Nineteenth",
                                            "Twentieth", "Twenty First", "Twenty Second", "Twenty Third", "Twenty Fourth", "Twenty Fifth", "Twenty Sixth",
                                            "Twenty Seventh", "Twenty Eighth", "Twenty Ninth",
                                            "Thirtieth", "Thirty First");
                      var daysInMonth = new Array(31,28,31,30,31,30,31,31,30,31,30,31);
                      var currtime = new Date();
                      var yr = currtime.getFullYear();
                      var mo = currtime.getMonth() +1;
                      var da = currtime.getDate();
                      if ((yr % 4) == 0)
                              daysInMonth[1] = 29;
                    }
        ( today
                    {
                      var da_str = new String((da < 10) ? ("0" + da.toString()) : da.toString());
                      var mo_str = new String((mo < 10) ? ("0" + mo.toString()) : mo.toString());
                      this.$value = yr + mo_str + da_str;
                      this.$tts = months[mo-1] + " " + days[da-1] + ", " + yr;
                    }
        | yesterday
                    {
                      yr = ((mo == 1) && (da == 1)) ? yr-1 : yr;
                      mo = (da == 1) ? (mo-1) : mo;
                      if (mo == 0) mo = 12;
                      var dam1 = (da == 1) ? (daysInMonth[mo-1]) : (da-1);
                      var dam1_str = new String((dam1 < 10) ? ("0" + dam1.toString()) : dam1.toString());
                      var mo_str = new String((mo < 10) ? ("0" + mo.toString()) : mo.toString());
                      this.$value = yr + mo_str + dam1_str;
                      this.$tts = months[mo-1] + " " + days[dam1-1] + ", " + yr;
                    }
        | tomorrow
                    {
                      yr = ((mo ==12) && (da ==31)) ? yr+1 : yr;
                      var mo0 = mo;
                      mo = (da == daysInMonth[mo-1]) ? (mo+1) : mo;
                      if (mo==13) mo = 1;
                      var dap1 = (da == daysInMonth[mo0-1]) ? 1 : (da+1);
                      var dap1_str = new String((dap1 < 10) ? ("0" + dap1.toString()) : dap1.toString());
                      var mo_str = new String((mo < 10) ? ("0" + mo.toString()) : mo.toString());
                      this.$value = yr + mo_str + dap1_str;
                      this.$tts = months[mo-1] + " " + days[dap1-1] + ", " + yr;
```

-continued

Appendix A: simpDate.gram

```
                       }
               );
// [in] [the year] [of] -all combinations except: "in of"
<of_yr> = ( in | in the year | in the year of | the year of | the year | of |
<NULL> );
<mo_of> = (in | in the month | in the month of | the month of | the month |
<NULL> );
<yr_of> = (in | in the year | in the year of | the year of | the year | <NULL> );
<ordinal2to9> = second                  { this.$value="2"; this.$tts="Second"; }
              | third                   { this.$value="3"; this.$tts="Third"; }
              | fourth                  { this.$value="4"; this.$tts="Fourth"; }
              | fifth                   { this.$value="5"; this.$tts="Fifth"; }
              | sixth                   { this.$value="6"; this.$tts="Sixth"; }
              | seventh           { this.$value="7"; this.$tts="Seventh"; }
              | eighth                  { this.$value="8"; this.$tts="Eighth"; }
              | ninth                   { this.$value="9"; this.$tts="Ninth"; };
<ordinal1to9> = first                        { this.$value="1"; this.$tts="First"; }
              | <ordinal2to9>                { this.$value=$ordinal2to9;
this.$tts=$ordinal2to9.$tts; };
<ordinal10to19> = tenth                 { this.$value="10"; this.$tts="Tenth"; }
                | eleventh                { this.$value="11"; this $tts="Eleventh"; }
                | twelfth                 { this.$value="12"; this $tts="Twelfth"; }
                | thirteenth              { this.$value="13"; this.$tts="Thirteenth"; }
                | fourteenth              { this.$value="14"; this $tts="Fourteenth"; }
                | fifteenth               { this.$value="15"; this.$tts="Fifteenth"; }
                | sixteenth               { this.$value="16"; this.$tts="Sixteenth"; }
                | seventeenth             { this.$value="17"; this $tts="Seventeenth"; }
                | eighteenth              { this.$value="18"; this.$tts="Eighteenth"; }
                | nineteenth              { this.$value="19"; this.$tts="Nineteenth"; };
<ordinal2to19> = <ordinal2to9>                { this.$value=$ordinal2to9;
this.$tts=$ordinal2to9.$tts; }
              | <ordinal10to19>              { this.$value=$ordinal10to19;
this.$tts=$ordinal10to19.$tts; };
<ordinal02to19> = <ordinal2to9>          { this.$value="0" + $ordinal2to9;
this.$tts=$ordinal2to9.$tts; }
              | <ordinal10to19>              { this.$value=$ordinal10to19;
this.$tts=$ordinal10to19.$tts; };
<ordinal01to19> = first                             { this.$value="01"; this.$tts="First"; }
              | <ordinal02to19>              { this.$value=$ordinal02to19;
this.$tts=$ordinal02to19.$tts, };
<ordinaltens20to90> = twentieth              { this.$value="20"; this.$tts="Twentieth"; }
                    | thirtieth          { this.$value="30"; this.$tts&"Thirtieth"; }
                    | fortieth               { this.$value="40"; this.$tts="Fortieth", }
                    | fiftieth               { this.$value="50"; this.$tts="Fiftieth"; }
                    | sixtieth               { this.$value="60"; this.$tts="Sixtieth"; }
                    | seventieth         { this.$value="70"; this.$tts="Seventieth"; }
                    | eightieth              { this.$value="80"; this.$tts="Eightieth"; }
                    | ninetieth              { this.$value="90"; this.$tts="Ninetieth"; };
<ordinal2to100> = <ordinal2to19>
                | <ordinaltens20to90>                   { this.$value=$ordinaltens20to90; }
                | <tens> <ordinal1to9>                  { this.$value=$tens + $ordinal1to9; }
                | [one] hundredth                       { this.$value="100"; };
<ordinal1to100> = first                                 { this.$value="01"; this.$tts="First"; }
                | <ordinal2to100>                  {this.$value=$ordinal2to100; };
<ordinal01to29> = <ordinal01to19>                       { this.$value=$ordinal01to19;
this.$tts=$ordinal01to19.$tts; }
              | twentieth                                 { this.$value="20";
this.$tts="Twentieth"; }
              | twenty <ordinal1to9>                    {this.$value="2" + $ordinal1to9;
this.$tts="Twenty " + $ordinal1to9.$tts; };
<ordinal01to30> = <ordinal01to29>              {this.$value=$ordinal01to29;
this.$tts=$ordinal01to29.$tts; }
              | thirtieth                         { this.$value="30"; this.$tts="Thirtieth";
};
<ordinal01to31> = <ordinal01to30 >         { this.$value=$ordinal01to30,
this.$tts=$ordinal01to30.$tts; }
              | thirty first                    { this.$value="31". this.$tts="Thirty
First"; };
// The following were moved from the number grammar
-----------------------------------------------------------
// (some of these are duplicated in the time grammar - if you change one here,
change the other as well) :
<2dNum1to99>    = <tens20to90> <numbers1to9>               { this.$value$tens20to90 +
$numbers1to9; }
              | <tens>                                       { this.$value=$tens + "0"; }
              | <teens>
              | <numbers1to9>                             { this.$value="0" + $numbers1to9;
```

-continued

Appendix A: simpDate.gram

```
};
<numbers01to99> = <numbers02to99>
                | (zero | oh | nil | null | ought) one { this.$value="01"; };
<numbers02to99> = (zero | oh | nil | null | ought) <numbers2to9>        {this.$value="0" +
$numbers2to9; }
                | <teens>
                | <tens>                              { this.$value=$tens + "0"; }
                | <tens> <numbers1to9>                { this.$value=$tens + $numbers1to9;
};
<numbers1to9>   = one           { this.$value="1"; }
                | <numbers2to9>
<numbers2to9>   = two           { this.$value="2"; }
                | three         { this.$value="3"; }
                | four          { this.$value="4"; }
                | five          { this.$value="5"; }
                | six           { this.$value="6"; }
                | seven         { this.$value="7"; }
                | eight         { this.$value="8"; }
                | nine          { this.$value="9"; };
<teens>         = eleven        { this.$value="11"; }
                | twelve        { this.Svalue="12"; }
                | thirteen      { this.$value="13"; }
                | fourteen      { this.$value="14"; }
                | fifteen       { this.$value="15"; }
                | sixteen       { this.$value="16"; }
                | seventeen     { this.$value="17"; }
                | eighteen      { this.$value="18"; }
                | nineteen      { this.$value="19"; };
<tens>          = ten           { this.$value="1"; }
                | twenty        { this.Svalue="2"; }
                | thirty        { this.$value="3"; }
                | forty         { this.$value="4"; }
                | fifty         { this.$value="5"; }
                | sixty         { this.$value="6"; }
                | seventy       { this.$value="7"; }
                | eighty        { this.$value="8"; }
                | ninety        { this.$value="9"; };
<tens20to90>    = twenty        { this.$value="2"; }
                | thirty        { this.$value="3"; }
                | forty         { this.$value="4"; }
                | fifty         { this.$value="5"; }
                | sixty         { this.$value="6"; }
                | seventy       { this.$value="7"; }
                | eighty        { this.$value="8"; }
                | ninety        { this.$value="9"; };
// --- end of rules that were moved from number.gram and possibly duplicated in
time.gram --------------------
```

What is claimed is:

1. A computer-implemented method for authoring a speech application, comprising the steps of:
   creating one or more reusable VoiceXML dialog components;
   creating an associated parameter object for each of the reusable VoiceXML dialog components; and
   creating a VoiceXML document comprising code for invoking a reusable VoiceXML dialog component and code for configuring the invoked reusable VoiceXML dialog component using an associated parameter object,
   wherein the step of creating a reusable VoiceXML dialog component comprises creating a re-entrant reusable VoiceXML dialog component that allow reusable VoiceXML dialog components to be one of initiated, interrupted, inspected, or resumed with a partially filled result object or state object.

2. The method of claim 1, further comprising the step of populating each associated parameter object with appropriate parameter values.

3. The method of claim 1, wherein the code for invoking a reusable VoiceXML dialog component comprises a subdialog element.

4. The method of claim 1, wherein the parameter object comprises a ECMAScript parameter object.

5. The method of claim 1, further comprising the step of building a library of reusable VoiceXML documents.

6. The method of claim 1, comprising the step of building a reusable VoiceXML dialog module comprising a standardized set of reusable VoiceXML dialog components.

7. The method of claim 1, wherein the parameter object comprises one of default prompts, object-specific resources, constructors that combine default and application specific parameters, methods for manipulating parameter content, and a combination thereof.

8. The method of claim 1, wherein the VoiceXML document further comprises code for dynamically compiling a grammar.

9. The method of claim 1, wherein re-entrant objects are used for mixed initiative.

10. The method of claim 1, wherein the VoiceXML document comprises code for calling application-specific objects comprising interaction objects and service objects.

11. The method of claim 10, wherein the code for calling an interaction object comprises a subdialog element and wherein the code for calling a service object comprises an object element.

12. A speech application server, comprising:
  a VoiceXML processor for parsing and rendering a VoiceXML document; and
  a database device storing a library comprising one or more reusable VoiceXML dialog components that are accessible by the VoiceXML processor via a communications network, wherein the VoiceXML document comprises code for invoking a reusable VoiceXML dialog component and code for configuring the invoked reusable VoiceXML dialog component using an associated parameter object,
  wherein the reusable VoiceXML dialog components comprise one or more re-entrant reusable VoiceXML dialog component that allow reusable VoiceXML dialog components to be one of initiated, interrupted, inspected, or resumed with a partially filled result object or state object.

13. The speech application server of claim 12, wherein a reusable VoiceXML dialog component is invoked using a subdialog element.

14. The speech application server of claim 12, wherein the parameter object comprises an ECMAScript parameter object.

15. The speech application server of claim 14, wherein an ECMAScript parameter object comprises a container that provides one of default prompts, object specific resources, constructors that combine default and application specific parameters, methods for manipulating parameter content and a combination thereof.

16. The speech application server of claim 12, wherein the library of reusable VoiceXML dialog components is maintained on a server repository for dynamic access at execution of a reusable VoiceXML dialog component, or maintained on a local repository, or both.

17. The speech application server of claim 16, wherein the repository further comprises default grammars and audio prompts to support behavior of the reusable VoiceXML dialog components.

18. The speech application server of claim 16, wherein the library further maintains a reusable VoiceXML dialog module comprising a standardized set of reusable VoiceXML dialog components.

19. The speech application of claim 18, wherein the reusable VoiceXML module supports dialog localization for other languages.

20. The speech application server of claim 12, further comprising repository of reusable ECMAScript functions.

21. The speech application server of claim 12, further comprising a repository for dynamic grammar compilers and audio prompt editors, which can be ported to the VoiceXML processor platform.

22. The speech application server of claim 12, wherein the VoiceXML processor comprises a VoiceXML browser.

23. The speech application server of claim 12, wherein the speech application server provides a speech interface for a multi-modal browser.

24. The speech application server of claim 12, wherein re-entrant objects are used for mixed initiative.

25. The speech application server of claim 12, wherein a reusable VoiceXML dialog component comprises an object element for providing dynamic data access.

26. A method for implementing a speech application, comprising the steps of:
  receiving and parsing a VoiceXML document;
  invoking a reusable VoiceXML dialog components using a subdialog element;
  instantiating an associated parameter object for configuring the invoked reusable VoiceXML document; and
  dynamically compiling a grammar for the involked reusable VoiceXML dialog component.

27. The method of claim 26, wherein the step of instantiating an associated parameter object comprises using ECMAScript.

28. The method of claim 27, further comprising maintaining a repository of default grammars and audio prompts.

29. The method of claim 26, further comprising the step of maintaining a repository comprising a library of reusable VoiceXML dialog component and associated parameter objects.

30. A program storage device readable by a machine, tangibly embodying a program of instructions executable by the machine to perform method steps for implementing a speech application, the method steps comprising:
  receiving and parsing a VoiceXML document;
  invoking a reusable VoiceXML dialog components using a subdialog element;
  instantiating an associated parameter object for configuring the invoked reusable VoiceXML document; and
  dynamically compiling a grammar for the involked reusable VoiceXML dialog component.

* * * * *